United States Patent [19]

Gutierrez et al.

[11] Patent Number: 5,128,056

[45] Date of Patent: Jul. 7, 1992

[54] ETHYLENE ALPHA-OLEFIN COPOLYMER SUBSTITUTED AMINO PHENOL MANNICH BASE LUBRICANT DISPERSANT ADDITIVES

[75] Inventors: Antonio Gutierrez, Mercerville; Won R. Song, Short Hills; Robert D. Lundberg, Bridgewater; Robert A. Kleist, Bayonne, all of N.J.

[73] Assignee: Exxon Chemical Patents Inc., Linden, N.J.

[21] Appl. No.: 672,223

[22] Filed: Mar. 20, 1991

Related U.S. Application Data

[63] Continuation of Ser. No. 226,767, Aug. 1, 1988, abandoned.

[51] Int. Cl.$^5$ ............................................. C10M 159/16
[52] U.S. Cl. .................. 252/51.005 A; 252/51.005 R
[58] Field of Search ...................... 252/51.5 A, 51.5 R

[56] References Cited

U.S. PATENT DOCUMENTS

| | | | |
|---|---|---|---|
| 3,442,808 | 5/1969 | Traise et al. | 252/49.6 |
| 3,458,495 | 7/1969 | Younghouse et al. | 260/136 |
| 4,354,950 | 10/1982 | Hammond et al. | 252/51.5 A |
| 4,668,834 | 5/1987 | Rim et al. | 585/12 |
| 4,704,491 | 11/1987 | Tsutsui et al. | 585/10 |

FOREIGN PATENT DOCUMENTS

| | | |
|---|---|---|
| 128046 | 5/1984 | European Pat. Off. . |
| 129368 | 5/1984 | European Pat. Off. . |
| 257696 | 12/1987 | European Pat. Off. . |
| 0305022 | 3/1989 | European Pat. Off. . |
| 129303A | 12/1987 | Japan . |
| 63-37102 | 2/1988 | Japan . |
| 8801626 | 10/1988 | PCT Int'l Appl. . |

OTHER PUBLICATIONS

Bogdanov, M. V. and O. L. Glavati, "Oxidative Thermal Degradation of Alkenylsuccinic Anhydrides", Neftehimiya 13:743-748, 1973 (English Translation).

Primary Examiner—Jacqueline Howard
Attorney, Agent, or Firm—J. B. Murray, Jr.; E. R. Skula; R. A. Maggio

[57] ABSTRACT

The present invention is directed to oil-soluble lubricating oil additives comprising Mannich Base condensates of (A) an ethylene-alpha-olefin polymer substituted mono- or dicarboxylic acid material, (B) an optionally alkyl-substituted N-hydroxyaryl compound, (C) an aldehyde, and (D) an amine, wherein the polyer moiety of the mono- or dicarboxylic acid material is derived from at least one terminally unsaturated ethylene alpha-olefin copolymer of 300 to 10,000 number average molecular weight, wherein the terminal unsaturation comprises ethenylidene unsaturation. The Mannich Base condensates of this invention are useful as dispersants.

46 Claims, No Drawings

ETHYLENE ALPHA-OLEFIN COPOLYMER SUBSTITUTED AMINO PHENOL MANNICH BASE LUBRICANT DISPERSANT ADDITIVES

This is a continuation of application Ser. No. 226,767, filed Aug. 1, 1988 now abandoned.

CROSS-REFERENCE TO RELATED APPLICATIONS

This application is related to copending applications Ser. No. 226,604, filed Aug. 1, 1988; Ser. No. 226,755, filed Aug. 1, 1988; and Ser. No. 226,759, filed Aug. 1, 1988.

FIELD OF THE INVENTION

This invention relates to improved oil soluble dispersant additives useful in oleaginous compositions, including fuel and lubricating oil compositions, and to concentrates containing said additives.

BACKGROUND OF THE INVENTION

U.S. Pat. No. 3,442,808 relates to lubricating oil additives prepared by reacting alkenyl succinic anhydride with the Mannich condensation product prepared by condensing alkyl substituted phenol, formaldehyde and polyalkylene polyamine.

U.S. Pat. No. 3,458,495 relates to oxidation inhibitors and dispersant-detergent oil additives comprising the reaction product of one equivalent of a phosphosulfurized hydrocarbon and about 0 5 to 4 equivalents of an alkylene amino phenol. The phosphosulfurized hydrocarbons are prepared by reacting a terpene, a petroleum fraction or a 500 to 200,000 molecular weight $C_2$ to $C_6$ olefin polymer (including polymers of ethylene, propylene, butylene, isobutylene or isoamylene) and from 5 to 40 wt % of a sulfide of phosphorous. The alkylene amino phenol is prepared by a Mannich Base condensation of aldehyde, alkylene polyamine and alkyl phenol.

U.S. Pat. No. 4,354,950 disloses a method of preparing Mannich base derivatives of hydroxyaryl succinimides of the formula:

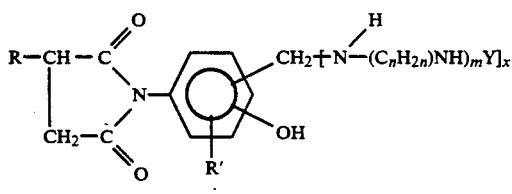

wherein R is hydrocarbyl of 25 to 200 carbon atoms, R' is H, alkyl or halogen, "n" is 2 or 3, "m" has a value of 1 to 5, Y is H or a methylene hydroxyaryl succinimide radical, "x" has a value of 1 to 2 when Y is H and a value of 1 when Y is a methylene hydroxyaryl succinimide radical. The above succinimides are formed in a stepwise reaction, e.g., by reacting a polyalkenyl succinic anhydride with an aminophenol, to produce an intermediate N-(hydroxyaryl) hydrocarbyl succinimide, which is then reacted with an alkylene diamine and an aldehyde (e.g., formaldehyde) in a Mannich base reaction to produce the described succinimides. The described succinimides may be added to a base oil of lubricating viscosity to form lubricant concentrates and lubricating oil formulations.

U.S. Pat. No. 4,668,834 to Uniroyal Chemical discloses preparation and composition of ethylene-alpha olefin copolymers and terpolymers, which are disclosed to be useful as intermediates in epoxy-grafted encapsulation compositions.

Japanese Published Patent Application 87-129,303A of Mitsui Petrochemical relates to narrow molecular weight distribution ($M_w/M_n < 2.5$) ethylene alpha-olefin copolymers containing 85-99 mol% ethylene, which are disclosed to be used for dispersing agents, modifiers or materials to produce toners. The copolymers (having crystallinity of from 5-85%) are prepared in the presence of a catalyst system comprising Zr compounds having at least one cycloalkadienyl group and alumoxane.

European Patent 128,046 discloses (co)polyolefin reactor blends of polyethylene and ethylene higher alpha-olefin copolymers prepared by employing described dual-metallocene/alumoxane catalyst systems.

European Patent Publication 129,368 discloses metallocene/alumoxane catalysts useful for the preparation of ethylene homopolymer and ethylene higher alpha-olefin copolymers.

European Patent Application Publication 257,696 A1 relates to a process for dimerizing alpha-olefins using a catalyst comprising certain metallocene/alumoxane systems.

PCT Published Patent Application WO 88/01626 relates to transition metal compound/alumoxane catalysts for polymerizing alpha-olefins.

SUMMARY OF THE INVENTION

In accordance with one aspect of the present invention, there are provided novel adducts formed by contacting under reaction conditions (A) at least one ethylene-alpha-olefin polymer substituted mono- or dicarboxylic acid material, (B) at least one N-hydroxyaryl amine, which can be optionally alky-substituted, (C) at least one aldehyde reactant, and (D) at least one amine-containing reactant, wherein the polymer substituent in the mono- or dicarboxylic acid material is derived from an ethylene-alpha-olefin polymer having a 300 to 10,000 number average molecular weight, and wherein at least 30 wt % of the polymer chains are terminally ethenylenically unsaturated, to form a Mannich Base condensate dispersant material.

In accordance with other aspects of the present invention, an oil-soluble lubricating oil additive is provided by a process which comprises (a) forming a Mannich Base condensate intermediate by reacting (B) an optionally alkyl-substituted N-hydroxyaryl amine with (C) at least one aldehyde reactant (e.g., formaldehyde) and (D) an amine, and thereafter (b) contacting the Mannich Base intermediate with (A) at least one ethylene-alpha-olefin polymer substituted mono- or dicarboxylic acid material, wherein the polymer substituent is derived from an ethylene-alpha-olefin polymer having a 300 to 10,000 number average molecular weight, and wherein at least 30 wt % of the polymer chains are terminally ethenylenically unsaturated, to form a Mannich Base condensate dispersant material.

In accordance with yet other aspects of the present invention, an oil-soluble lubricating oil additive is provided by a process which comprises (a) contacting (A) at least one ethylene-alpha-olefin polymer substituted mono- or dicarboxylic acid material, wherein the polymer substituent is derived from an ethylene-alpha-olefin polymer having a 300 to 10,000 number average molecular weight, and wherein at least 30 wt % of the polymer chains possess terminal ethenylenidene unsaturation, with (B) an optionally alkyl-substituted N-hydroxyaryl amine to form a polymer-substituted carbonyl-amino aromatic material, and (b) contacting said polymer-substituted carbonyl-amino aromatic material with (C) at least one aldehyde reactant (e.g., formaldehyde) and (D) an amine, to form the desired Mannich Base condensate dispersant material.

The process of this invention permits the preparation of novel oil-soluble Mannich Base condensate lubricating oil additives which are simultaneously characterized by a low concentration of unreacted polymer (usually less than about 40 wt. %, e.g., from 5 to 35 wt. %) and by advantageous viscosity properties to permit the additives to be readily handled. In addition, the novel ethylene alpha-olefin polymer substituted Mannich Base condensate additives of this invention can be characterized by VR values (as hereinafter defined) of not greater than about 4.1, thereby providing advantageous viscosity modifying properties to the lubricating oils containing them. The present invention can produce such substituted polymers in a highly concentrated form as substantially halogen free materials, thereby reducing the corrositivity processing difficulties and environmental concerns which are associated with halogen-containing lubricating oil additives.

Further, dispersant materials can be prepared from the substituted polymers of this invention to provide lubricating oil dispersant products having VR' values of not greater than about 4.1 and VR'/VR$_r$ ratios of less than about 1.11 (as such values and ratios are hereinafter defined). Surprisingly, the process of this invention permits the preparation of highly concentrated, substantially halogen-free dispersants from high molecular weight ethylene-alpha-olefin polymers ($M_n > 5000$, e.g., 5,500–10,000) of superior viscosity properties.

The materials of the invention are different from the prior art Mannich Base materials because of their effectiveness and their ability to provide enhanced lubricating oil dispersancy, as exhibited by their enhanced sludge and varnish control properties.

DETAILED DESCRIPTION OF THE INVENTION

Preparation of Ethylene Alpha-Olefin Copolymer

The polymers employed in this invention are polymers of ethylene and at least one alpha-olefin having the formula $H_2C=CHR^1$ wherein $R^1$ is straight chain or branched chain alkyl radical comprising 1 to 18 carbon atoms and wherein the polymer contains a high degree of terminal ethenylidene unsaturation. Preferably $R^1$ in the above formula is alkyl of from 1 to 8 carbon atoms, and more preferably is alkyl of from 1 to 2 carbon atoms. Therefore, useful comonomers with ethylene in this invention include propylene, 1-butene, hexene-1, octene-1, 4-methylpentene-1, decene-1, dodecene-1, tridecene-1, tetradecen-1, pentadecene-1, hexadecene-1, heptadecene-1, octadecene-1, nonadecene-1 and mixtures thereof (e.g., mixtures of propylene and 1-butene, and the like).

Exemplary of such polymers are ethylene-propylene copolymers, ethylene-butene-1 copolymers and the like. Preferred polymers are copolymers of ethylene and propylene and ethylene and butene-1.

The molar ethylene content of the polymers employed in this invention is preferably in the range of between about 20 and about 80 percent, and more preferably between about 30 and about 70 percent. When propylene and/or butene-1 are employed as comonomer(s) with ethylene, the ethylene content of such copolymers is most preferably between about 45 and about 65 percent, although higher or lower ethylene contents may be present.

The polymers employed in this invention generally possess a number average molecular weight of from about 300 to about 10,000, preferably of from about 700 to about 5,000; most preferably of from about 1500 to about 3000. The number average molecular weight for such polymers can be determined by several known techniques. A convenient method for such determination is by size exclusion chromatography (also known as gel permeation chromatography (GPC)) which additionally provides molecular weight distribution information, see W. W. Yau, J. J. Kirkland and D. D. Bly, "Modern Size Exclusion Liquid Chromatography", John Wiley and Sons, New York, 1979.

Consequently, such polymers generally possess an intrinsic viscosity (as measured in tetralin at 135° C.) of between about 0.025 and about 0.6 dl/g, preferably of between about 0.05 and about 0.5 dl/g, most preferably of between about 0.075 and about 0.4 dl/g.

The polymers employed in this invention preferably exhibit a degree of crystallinity such that, when grafted, they are essentially amorphous.

The polymers employed in this invention are further characterized in that up to about 95% and more of the polymer chains possess terminal ethenylidene-type unsaturation. Thus, one end of such polymers will be of the formula POLY-C($T^1$)=$CH_2$ wherein $T^1$ is $C_1$ to $C_{18}$ alkyl, preferably $C_1$ to $C_8$ alkyl, and more preferably $C_1$ to $C_2$ alkyl, (e.g., methyl or ethyl) and wherein POLY represents the polymer chain. The chain length of the $T^1$ alkyl group will vary depending on the comonomer(s) selected for use in the polymerization. A minor amount of the polymer chains can contain terminal ethenyl unsaturation, i.e. POLY-CH=$CH_2$, and a portion of the polymers can contain internal monounsaturation, e.g. POLY-CH=CH($T^1$), wherein $T^1$ is as defined above.

The polymer employed in this invention comprises polymer chains, at least about 30 percent of which possess terminal ethenylidene unsaturation. Preferably at least about 50 percent, more preferably at least about 60 percent, and most preferably at least about 75 percent (e.g. 75-98%), of such polymer chains exhibit terminal ethyenylidene unsaturation. The percentage of polymer chains exhibiting terminal ethyenylidene unsaturation may be determined by FTIR spectroscopic analysis, titration, or $C^{13}NMR$.

The polymer and the composition employed in this invention may be prepared as described in U.S. Pat. No. 4,668,834, in European Patent Publications 128,046 and 129,368, and in co-pending Ser. No. 728,111, filed Apr. 29, 1985, and copending Ser. No. 93,460, filed Sep. 10, 1987, the disclosures of all of which are hereby incorporated by reference in their entirety.

The polymers for use in the present invention can be prepared by polymerizing monomer mixtures comprising ethylene in combination with other monomers such as alpha-olefins having from 20 carbon atoms (and preferably from 3-4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers.

The catalysts employed in the production of the reactant polymers are organometallic coordination compounds which are cyclopentadienyl derivatives of a Group 4b metal of the Periodic Table of the Elements (56th Edition of Handbook of Chemistry and Physics, CRC Press [1975]) and include mono, di and tricyclopentadienyls and their derivatives of the transition metals. Particularly desirable are the metallocene of a Group 4b metal such as titanium, zirconium, and hafnium. The alumoxanes employed in forming the reaction product with the metallocenes are themselves the reaction products of an aluminum trialkyl with water.

In general, at least one metallocene compound is employed in the formation of the catalyst. As indicated, supra, metallocene is a metal derivative of a cyclopentadiene. The metallocenes usefully employed in accordance with this invention contain at least one cyclopentadiene ring. The metal is selected from the Group 4b preferably titanium, zirconium, and hafnium, and most preferably hafnium and zirconium. The cyclopentadienyl ring can be unsubstituted or contain one or more substituents (e.g., from 1 to 5 substituents) such as, for example, a hydrocarbyl substituent (e.g., up to 5 $C_1$ to $C_5$ hydrocarbyl substituents) or other substituents, e.g. such as, for example, a trialkyl silyl substituent. The metallocene can contain one, two, or three cyclopentadienyl rings; however, two rings are preferred.

Useful metallocenes can be represented by the general formulas:

$$(Cp)_m MR_n X_q \qquad \text{I.}$$

wherein Cp is a cyclopentadienyl ring, M is a Group 4b transition metal, R is a hydrocarbyl group or hydrocarboxy group having from 1 to 20 carbon atoms, X is a halogen, and m is a whole number from 1 to 3, n is a whole number from 0 to 3, and q is a whole number from 0 to 3.

$$(C_5R'_k)_g R''_s(C_5R'_k) MQ_{3-g} \qquad \text{II.}$$

$$R''_s(C_5R'_k)_2 MQ' \qquad \text{III.}$$

wherein $(C_5R'_k)$ is a cyclopentadienyl substituted cyclopentadienyl, each R, is the same or different and is hydrogen or a hydrocarbyl radical such as alkyl, alkenyl, aryl, alkylaryl, or arylalkyl radical containing from 1 to 20 carbon atoms, a silicon containing hydrocarbyl radical, or hydrocarbyl radicals wherein two carbon atoms are joined together to form a $C_4$-$C_6$ ring, R" is a $C_1$-$C_4$ alkylene radical, a dialkyl germanium or silicon, or a alkyl phosphine or amine radical bridging two $(C_5R'_k)$ rings, Q is a hydrocarbyl radical such as aryl, alkyl, alkenyl, alkylaryl, or aryl alkyl radical having from 1-20 carbon atoms, hydrocarboxy radical having from 1-20 carbon atoms or halogen and can be the same or different from each other, Q' is an alkylidene radical having from 1 to about 20 carbon atoms, s is 0 or 1, g is 0, 1 or 2, s is 0 when g is 0, k is 4 when s is 1, and k is 5 when s is 0, and M is as defined above. Exemplary hydrocarbyl radicals are methyl, ethyl, propyl, butyl, amyl, isoamyl, hexyl, isobutyl, heptyl, octyl, nonyl, decyl, cetyl, 2-ethylhexyl, phenyl and the like. Exemplary silicon containing hydrocarbyl radicals are trimethylsilyl, triethylsilyl and triphenylsilyl. Exemplary halogen atoms include chlorine, bromine, fluorine and iodine and of these halogen atoms, chlorine is preferred. Exemplary hydrocarboxy radicals are methoxy ethoxy, butoxy, amyloxy and the like. Exemplary of the alkylidene radicals is methylidene, ethylidene and propylidene.

Illustrative, but non-limiting examples of the metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl bis(cyclopentadienyl)zirconium diphenyl bis(cyclopentadienyl)hafnium dimethyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl) titanium ethyl chloride bis(cyclopentadienyl)titanium phenyl chloride, bis(cyclopentadienyl)zirconium hydrochloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide, bis(cyclopentadienyl)titanium methyl iodide, bis(cyclopentadienyl)titanium ethyl bromide, bis(cyclopentadienyl)titanium ethyl iodide, bis(cyclopentadienyl)titanium phenyl bromide, bis(cyclopentadienyl)titanium phenyl iodide, bis(cyclopentadienyl)zirconium methyl bromide, bis(cyclopentadienyl)zirconium methyl iodide, bis(cyclopentadienyl)zirconium ethyl bromide, bis(cyclopentadienyl)zirconium ethyl iodide, bis(cyclopentadienyl)zirconium phenyl bromide, bis(cyclopentadienyl)zirconium phenyl iodide; the trialkyl metallocenes such as cyclopentadienyltitanium trimethyl, cyclopentadienyl zirconium triphenyl, and cyclopentadienyl zirconium trineopentyl, cyclopentadienylzirconium trimethyl, cyclopentadienylhafnium triphenyl, cyclopentadienylhafnium trineopentyl and cyclopentadienylhafnium trimethyl.

Illustrative, but non-limiting examples of II and III metallocenes which can be usefully employed are monocyclopentadienyls titanocenes such as, pentamethylcyclopentadienyl titanium trichloride, pentaethylcyclopentadienyl titanium trichloride, bis(pentamethylcyclopentadienyl) titanium diphenyl, the carbene represented by the formula bis(cyclopentadienyl)titanium=$CH_2$ and derivatives of this reagent such as bis(cyclopentadienyl)Ti=$CH_2$.Al($CH_3$)$_3$, (Cp$_2$Ti—$CH_2$)$_2$, Cp$_2$TiCH$_2$CH(CH$_3$)CH$_2$, Cp$_2$Ti—$CH_2CH_2CH_2$; substituted bis(Cp)Ti (IV) compounds such as bis(indenyl) titanium diphenyl or dichloride, bis(methylcyclopentadienyl)titanium diphenyl or dihalides; dialkyl, trialkyl, tetra-alkyl and penta-alkyl cyclopentadienyl titanium compounds such as bis(1,2-dimethylcyclopentadienyl)titanium diphenyl or dichloride, bis(1,2-diethylcyclopentadienyl)titanium diphenyl or dichloride and other dihalide complexes; silicon, phosphine, amine or carbon bridged cyclopentadiene complexes, such as dimethylsilyldicyclopentadienyl titanium diphenyl or dichloride, methyl phosphine dicyclopentadienyl titanium diphenyl or dichloride, methylenedicyclopentadienyl titanium diphenyl or dichloride and other complexes described by formulae II and III.

Illustrative but non-limiting examples of the zirconocenes of Formula II and III which can be usefully employed are, pentamethylcyclopentadienyl zirconium trichloride, pentaethylcyclopentadienyl zirconium trichloride, the alkyl substituted cyclopentadienes, such as bis(ethylcyclopentadienyl) zirconium dimethyl, bis(beta-phenylpropylcyclopentadienyl) zirconium dimethyl, bis(methylcyclopentadienyl) zirconium dimethyl, bis(n-butylcyclopentadienyl) zirconium dimethylbis(cyclohexylmethylcyclopentadienyl)zirconium dimethyl bis(n-octyl-cyclopentadienyl)zirconium dimethyl, and haloalkyl and dihydride, and dihalide complexes of the above; dialkyl, trialkyl, tetra-alkyl, and penta-alkyl cyclopentadienes, such as bis(pentamethylcyclopentadienyl)zirconium diphenyl, bis(pentamethylcyclopenta dienyl)zirconium dimethyl, bis(1,2-dimethylcyclopentadienyl)zirconium dimethyl and mono and dihalide and hydride complexes of the above; silicon, phosphorus, and carbon bridged cyclopentadiene complexes such as dimethylsilyldicyclopentadienyl zirconium dimethyl, methyl halide or dihalide, and methylene dicyclopentadienyl zirconium dimethyl, methyl halide, or dihalide. Mono, di and tri-silyl substituted cyclopentadienyl compounds such as bis(trimethylsilylcyclopentadienyl)zirconium dichloride and dimethyl bis(1,3-di-trimethylsilylcyclopentadienyl) zirconium dichloride and dimethyl and bis(1,2,4-tri-trimethylsilylcyclopentadienyl)zirconium dichloride and dimethyl. Carbenes represented by the formulae $Cp_2Zr=CH_2P(C_6H_5)_2CH_3$, and derivatives of these compounds such as $Cp_2ZrCH_2CH(CH_3)CH_2$.

Mixed cyclopentadienyl metallocene compounds such as cyclopentadienyl (pentamethyl cyclopentadienyl)zirconium dichloride, (1,3-di-trimethylsilylcyclopentadienyl) (pentamethylcyclopentadienyl) zirconium dichloride, and cyclopentadienyl(indenyl) zirconium dichloride can be employed.

Most preferably, the polymers used in this invention are substantially free of ethylene homopolymer.

Bis (cyclopentadienyl)hafnium dichloride, bis(cyclopentadienyl)hafnium; dimethyl, bis(cyclopentadienyl)vanadium dichloride and the like are illustrative of other metallocenes.

Some preferred metallocenes are bis(cyclopentadienyl)zirconium; dimethyl, bis(cyclopentadienyl)zirconium dichloride; bis(cyclopentadienyl)titanium dichloride; bis(methylcyclopentadienyl) zirconium dichloride; bis (methylcyclopentadienyl) titanium dichloride; bis(n-butylcyclopentadienyl)zirconium dichloride; dimethylsilyldicyclopentadienyl zirconium dichloride; bis(trimethylsilycyclopentadienyl)zirconium dichloride; and dimethylsilyldicyclopentadienyl titanium dichloride; bis (indenyl) zirconium dichloride; bis(4,5,6,7-tetrahydroindenyl)zirconium dichloride; the racemic and/or meso isomer of 1,2-ethylene-bridged bis(4,5,6,7-tetrahydroindenyl)zirconium dichloride; the racemic and/or meso isomer of 1,1-dimethylsilyl-bridged bis(4,5,6,7-tetrahydroindenyl)zirconium dichloride; and the racemic and/or meso isomer of 1,1-dimethylsilyl-bridged bis(methylcyclopentadienyl)zirconium dichloride.

The alumoxane compounds useful in the polymerization process may be cyclic or linear. Cyclic alumoxanes may be represented by the general formula (R—Al—O)$_n$ while linear alumoxanes may be represented by the general formula R(R—Al—O)n'AlR$_2$. In the general formula R is a $C_1$-$C_5$ alkyl group such as, for example, methyl, ethyl, propyl, butyl and pentyl, n is an integer of from 3 to 20, and n' is an integer from 1 to about 20. Preferably, R is methyl and n and n' are 4–18. Generally, in the preparation of alumoxanes from, for example, aluminum trimethyl and water, a mixture of the linear and cyclic compounds is obtained.

The alumoxane can be prepared in various ways. Preferably, they are prepared by contacting water with a solution of aluminum trialkyl, such as, for examples, aluminum trimethyl, in a suitable organic solvent such as toluene or an aliphatic hydrocarbon. For example, the aluminum alkyl is treated with water in the form of a moist solvent. In an alternative method, the aluminum alkyl such as aluminum trimethyl can be desirably contacted with a hydrated salt such as hydrated copper sulfate or ferrous sulfate. Preferably, the alumoxane is prepared in the presence of a hydrated ferrous sulfate. The method comprises treating a dilute solution of aluminum trimethyl in, for example, toluene, with ferrous sulfate represented by the general formula $FeSO_4 \cdot 7H_2O$. The ratio of ferrous sulfate to aluminum trimethyl is desirably about 1 mole of ferrous sulfate for 6 to 7 moles of aluminum trimethyl. The reaction is evidenced by the evolution of methane.

The mole ratio of aluminum in the alumoxane to total metal in the metallocenes which can be usefully employed can be in the range of about 0.5:1 to about 1000:1, and desirably about 1:1 to about 100:1. Preferably, the mole ratio will be in the range of 50:1 to about 5:1 and most preferably 20:1 to 5:1.

The solvents used in the preparation of the catalyst system are inert hydrocarbons, in particular a hydrocarbon that is inert with respect to the catalyst system. Such solvents are well known and include, for example, isobutane, butane, pentane, hexane, heptane, octane, cyclohexane, methylcyclohexane, toluene, xylene and the like.

Polymerization is generally conducted at temperatures ranging between about 20° and about 300° C., preferably between about 30° and about 200° C. Reaction time is not critical and may vary from several hours or more to several minutes or less, depending upon factors such as reaction temperature, the monomers to be copolymerized, and the like. One of ordinary skill in the art may readily obtain the optimum reaction time for a given set of reaction parameters by routine experimentation.

The catalyst systems described herein are suitable for the polymerization of olefins in solution over a wide range of pressures. Preferably, the polymerization will be completed at a pressure of from about 10 to about 3,000 bar, and generally at a pressure within the range from about 40 bar to about 2,000 bar, and most preferably, the polymerization will be completed at a pressure within the range from about 50 bar to about 1,500 bar.

After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by processes well known in the art. Any excess reactants may be flashed off from the polymer.

The polymerization may be conducted employing liquid monomer, such as liquid propylene, or mixtures of liquid monomers (such as mixtures of liquid propylene and 1-butene), as the reaction medium. Alternatively, polymerization may be accomplished in the presence of a hydrocarbon inert to the polymerization such as butane, pentane, isopentane, hexane, isooctane, decane, toluene, xylene, and the like.

In those situations wherein the molecular weight of the polymer product that would be produced at a given set of operating conditions is higher than desired, any of the techniques known in the prior art for control of molecular weight, such as the use of hydrogen and/or polymerization temperature control, may be used in the process of this invention. If so desired, the polymerization may be carried out in the presence of hydrogen to lower the polymer molecular weight. Care should be taken to assure that terminal ethenylidene unsaturation is not reduced to less than about 30 percent of the polymer chains.

However, the polymers are preferably formed in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), ethylene and alpha-olefin comonomer(s) are charged at appropriate ratios to a suitable reactor. Care must be taken that all ingredients are dry, with the reactants typically being passed through molecular sieves or other drying means prior to their introduction into the reactor. Subsequently, either the catalyst and then the cocatalyst, or first the cocatalyst and then the catalyst are introduced while agitating the reaction mixture, thereby causing polymerization to commence. Alternatively, the catalyst and cocatalyst may be premixed in a solvent and then charged to the reactor. As polymer is being formed, additional monomers may be added to the reactor. Upon completion of the reaction, unreacted monomer and solvent are either flashed or distilled off, if necessary by vacuum, and the low molecular weight copolymer withdrawn from the reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

PREPARATION OF ETHYLENE ALPHA-OLEFIN POLYMER SUBSTITUTED MONO- OR DICARBOXYLIC ACID MATERIAL

The ethylene alpha-olefin polymer substituted mono- or dicarboxylic acid material, i.e., acid, anhydride or acid ester of this invention, includes the reaction product of ethylene alpha-olefin polymer with a monounsaturated carboxylic reactant comprising at least one member selected from the group consisting of (i) monounsaturated $C_4$ to $C_{10}$ dicarboxylic acid wherein (a) the carboxyl groups are vicinyl, (i.e. located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or di-esters of (i); (iii) monounsaturated $C_3$ to $C_{10}$ monocarboxylic acid wherein the carbon-carbon double bond is allylic to the carboxy group, i.e, of the structure

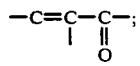

and (iv) derivatives of (iii) such as $C_1$ to $C_5$ alcohol derived mono- or di-esters of (iii). Upon reaction with the polymer, the monounsaturation of the monounsaturated carboxylic reactant becomes saturated. Thus, for example, maleic anhydride becomes a polymer substituted succinic anhydride, and acrylic acid becomes a polymer substituted propionic acid.

Typically, from about 0.7 to about 4.0 (e.g., 0.8 to 2.6), preferably from about 1.0 to about 2.0, and most preferably from about 1.1 to about 1.7 moles of said monounsaturated carboxylic reactant are charged to the reactor per mole of polymer charged.

Normally, not all of the polymer reacts with the monounsaturated carboxylic reactant and the reaction mixture will contain unreacted polymer. The unreacted polymer is typically not removed from the reaction mixture (because such removal is difficult and would be commercially infeasible) and the product mixture, stripped of any monounsaturated carboxylic reactant is employed for further reaction with the amine or alcohol as described hereinafter to make the dispersant.

Characterization of the average number of moles of monounsaturated carboxylic reactant which have reacted per mole of polymer charged to the reaction (whether it has undergone reaction or not) is defined herein as functionality. Said functionality is based upon (i) determination of the saponification number of the resulting product mixture using potassium hydroxide; and (ii) the number average molecular weight of the polymer charged, using techniques well known in the art. Functionality is defined solely with reference to the resulting product mixture. Although the amount of said reacted polymer contained in the resulting product mixture can be subsequently modified, i.e. increased or decreased by techniques known in the art, such modifications do not alter functionality as defined above. The terms ethylene-alpha-olefin polymer substituted monocarboxylic acid material and ethylene-alpha-olefin polymer substituted dicarboxylic acid material are intended to refer to the product mixture whether it has undergone such modification or not.

Accordingly, the functionality of the ethylene-alpha-olefin polymer substituted mono- and dicarboxylic acid material will be typically at least about 0.5, preferably at least about 0.8, and most preferably at least about 0.9 and will vary typically from about 0.5 to about 2.8 (e.g., 0.6 to 2), preferably from about 0.8 to about 1.4, and most preferably from about 0.9 to about 1.3.

Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, etc.

The polymer can be reacted with the monounsaturated carboxylic reactant by a variety of methods. For example, the polymer can be first halogenated, chlorinated or brominated to about 1 to 8 wt. % preferably 3 to 7 wt. % chlorine, or bromine, based on the weight of polymer, by passing the chlorine or bromine through the polymer at a temperature of 60° to 250° C., preferably 110° to 160° C., e.g. 120° to 140° C., for about 0.5 to 10, preferably 1 to 7 hours. The halogenated polymer may then be reacted with sufficient monounsaturated carboxylic reactant at 100° to 250° C., usually about 180° to 235° C., for about 0.5 to 10, e.g. 3 to 8 hours, so the product obtained will contain the desired number of moles of the monounsaturated carboxylic reactant per mole of the halogenated polymer. Processes of this general type are taught in U.S. Pat. Nos. 3,087,436; 3,172,892; 3,272,746 and others. Alternatively, the polymer and the monounsaturated carboxylic reactant are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

While chlorination normally helps increase the reactivity of polyolefins with monounsaturated carboxylic reactant, it is not necessary with the present polymers due to their high terminal bond content and reactivity. Preferably, therefore, the polymer and the monounsaturated carboxylic reactant are contacted at elevated temperature to cause a thermal "ene" reaction to take place. Thermal "ene" reactions have been heretofore described in U.S. Pat. Nos. 3,361,673 and 3,401,118, the disclosures of which are hereby incorporated by reference in their entirety. It has been surprisingly found that the terminally ethylenically-unsaturated ethylene alpha-olefin polymers used in this invention readily undergo such thermal "ene" reactions under conditions in which the formation of sediment, or other by-products contributing to product haze, is greatly minimized or avoided altogether. The improved low sediment ene reaction product mixture is preferably formed using a polymer (more preferably, ethylene-propylene copolymers) having a number average molecular weight of from about 900 to 10,000, more preferably from about 1500 to 10,000, and most preferably greater than about 1800 to about 5,000, and a polydispersity of less than about 4, preferably less than about 3, e.g., from 1.1 to 3.5, most preferably from 1.2 to 3.

Preferably, the polymers used in this invention contain less than 5 wt %, more preferably less than 2 wt %, and most preferably less than 1 wt % of a polymer fraction comprising polymer molecules having a molecular weight of less than about 300, as determined by high temperature gel premeation chromatography employing the corresponding polymer calibration curve. Such preferred polymers have been found to permit the preparation of ene reaction products, particularly when employing maleic anhydride as the unsaturated acid reactant, with substantially no visibly observable sediment. In the event the polymer produced as described above contains greater than about 5 wt % of such a low molecular weight polymer fraction, the polymer can be first treated by conventional means to remove the low molecular weight fraction to the desired level prior to initiating the ene reaction, and preferably prior to contacting the polymer with the selected unsaturated carboxylic reactant(s). For example, the polymer can be heated preferably with inert gas (e.g., nitrogen) stripping, at elevated temperature under a reduced pressure to volatilize the low molecular weight polymer components which can then be removed from the heat treatment vessel. The precise temperature, pressure and time for such heat treatment can vary widely depending on such factors as the polymer number average molecular weight, the amount of the low molecular weight fraction to be removed, the particular monomers employed and other factors. Generally, a temperature of from about 60° to 100° C. and a pressure of from about 0.1 to 0.9 atmospheres and a time of from about 0.5 to 20 hours (e.g., 2 to 8 hours) will be sufficient.

In this process, the selected polymer and monounsaturated carboxylic reactant are contacted for a time and under conditions effective to form the desired ethylene alpha-olefin polymer substituted mono- or dicarboxylic acid material. Generally, the polymer and monounsaturated carboxylic reactant will be contacted in a polymer to unsaturated carboxylic reactant mole ratio usually from about 1:1 to 1:10, and preferably from about 1:1 to 1:5, at an elevated temperature, generally from about 120° to 260° C., preferably from about 160° to 240° C. The reaction will be generally carried out, with stirring for a time of from about 1 to 20 hours, preferably from about 2 to 6 hours. The reaction is preferably conducted in the substantial absence of $O_2$ and water (to avoid competing side reactions), and to this end can be conducted in an atmosphere of dry $N_2$ gas or other gas inert under the reaction conditions. The reactants can be charged separately or together as a mixture to the reaction zone, and the reaction can be carried out continuously, semi-continuously or batchwise. Although not generally necessary, the reaction can be carried out in the presence of a liquid diluent or solvent, e.g., a hydrocarbon diluent such as mineral lubricating oil, toluene, xylene, dichlorobenzene and the like. The polymer substituted mono- or dicarboxylic acid material thus formed can be recovered from the liquid reaction mixture, e.g., after stripping the reaction mixture, if desired, with an inert gas such as $N_2$ to remove unreacted unsaturated carboxylic reactant.

The "ene" reaction product mixture thereby obtained has been surprisingly found to have a substantially reduced content of sediment or other solid by-products as impurities and can be employed, without filtering, centrifuging, clarification, phase separation or other conventional product purification treatments, as, e.g., an additive to lubricating oils or as intermediate in the preparation of derivative products for use in lubricating oils, as will be more completely described hereinafter.

The ene reaction product mixture is further improved by being substantially free of chlorine, that is, by having a chlorine content of less than about 25 ppm by weight, preferably less than about 10 ppm by weight.

The ene reaction product mixture comprising the desired ethylene-alpha-olefin substituted mono- or dicarboxylic acid material (e.g., ethylene-propylene polymer-substituted succinic anhydride) formed by the process of this invention will generally contain unreacted polymer (i.e., polymer unsubstituted by a carboxy moiety derived from the monounsaturated carboxylic reactant) in a concentration of less than about 40 wt. % (e.g., from 5 to wt. %), more preferably less than about 30 wt. % (e.g., from 10 to 25 wt. %), and will be generally characterized by a VR value ("viscosity ratio" value) of not greater than about 4.1, usually not greater than about 4.0, preferably from about 2.0 to 3.9, and most preferably from about 3.0 to 3.8. As used herein, the term "VR value" is intended to mean quotient determined by the expression (IV):

$$VR = \frac{VISb}{VISa}$$

wherein VISa is the kinematic viscosity (KV) of the ene reaction product mixture at 100° C. in units of centistokes (as determined by ASTM Method No. D445) and VISb is the cold cranking simulator (CCS) viscosity of the ene reaction product mixture at −20° C. in units of poise (as determined by ASTM Method No. D2602), wherein the measurements are made upon a 2 wt % solution of the ene reaction product mixture in an oil (herein termed the "reference oil") comprising S150N (solvent 150 neutral) mineral lubricating oil (Exxon Company U.S.A.), wherein the such reference oil is characterized by an ASTM D445 kinematic viscosity of 5.2 cSt (100° C.) and an ASTM D2602 CCS viscosity of 19.2 poise (±0.4 poise) (at −20° C.). The "$VR_r$" value of the reference oil will then be about 3.7 ±0.1.

Illustrative, therefore, of the improved ene reaction products of this invention are the following ethylene-propylene copolymer-substituted succinic acids and succinic anhydrides (EPSA), ethylene -butene-1 copolymer-substituted succinic acids and succinic anhydrides (EBSA) summarized in Table A below:

TABLE A

| Ene Product | Polymer (Mn) | Residual Halide (wppm) | Wt. % ai (1) | SA: Polymer Mole Ratio (2) | VR Value (3) |
|---|---|---|---|---|---|
| EPSA | 300–10,000 | ≦25 | ≧60 | ≧0.7:1 | ≦4.1 |
| EPSA | 300–10,000 | ≦10 | ≧60 | ≧1.0:1 | ≦4.0 |
| EPSA | 700–5,000 | ≦25 | ≧60 | ≧0.7:1 | ≦4.1 |
| EPSA | 700–5,000 | ≦10 | ≧60 | ≧1.0:1 | ≦4.0 |
| EPSA | 5,500–10,000 | ≦25 | ≧60 | ≧0.7:1 | ≦4.1 |
| EPSA | 5,500–10,000 | ≦10 | ≧70 | ≧0.7:1 | ≦4.0 |
| EPSA | 1,500–10,000 | ≦10 | 70–90 | ≧1.0:1 | ≦4.1 |
| EBSA | 300–10,000 | ≦25 | ≧60 | ≧0.7:1 | ≦4.1 |
| EBSA | 300–10,000 | ≦10 | ≧60 | ≧1.0:1 | ≦4.0 |
| EBSA | 700–5,000 | ≦25 | ≧60 | ≧0.7:1 | ≦4.1 |
| EBSA | 700–5,000 | ≦25 | ≧60 | ≧1.0:1 | ≦4.0 |
| EBSA | 5,500–10,000 | ≦25 | ≧60 | ≧0.7:1 | ≦4.1 |
| EBSA | 5,500–10,000 | ≦10 | ≧70 | ≧0.7:1 | ≦4.0 |
| EBSA | 1,500–10,000 | ≦25 | 70–90 | ≧1.0:1 | ≦4.0 |

NOTES:
(1) Wt. % active ingredient.
(2) SA = succinic anhydride; polymer-ethylene-propylene (EP) or ethylene butylene (EB) copolymer; moles of polymer in ratio based on the total of both the reacted and unreacted polymer; moles of "SA" based on the number of moles of succinic anhydride moieties per mole of ene reaction product.

It will be understood that the ethylene alpha-olefin polymers of this invention which are charged to the alkylation reaction zone can be charged alone or together with (e.g., in admixture with) other polyalkenes derived from alkenes having from 1 to 20 carbon atoms (butene, pentene, octene, decene, dodecene, tetradodecene and the like) and homopolymers of $C_3$ to $C_{10}$, e.g., $C_2$ to $C_5$, monoolefins, and copolymers of $C_2$ to $C_{10}$, e.g., $C_2$ to $C_5$, monoolefins, said additional polymer having a number average molecular weight of at least about 900, and a molecular weight distribution of less than about 4.0, preferably less than about 3.0 (e.g, from 1.2 to 2.8). Preferred such additional olefin polymers comprise a major molar amount of $C_2$ to $C_{10}$, e.g. $C_2$ to $C_5$ monoolefin. Such olefins include ethylene, propylene, butylene, isobutylene, pentene, octene-1, styrene, etc. Exemplary of the additionally charged homopolymers is polypropylene, polyisobutylene, and poly-n-butene, and the like as well as interpolymers of two or more of such olefins such as copolymers of: ethylene and propylene (prepared by conventional methods other than as described above for the preferred ethylene alpha-olefin copolymers employed in this invention, that is, ethylene-propylene copolymers which are substantially saturated, wherein less than about 10 wt % of the polymer chains contain ethylenic unsaturation); butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene: or a copolymer of ethylene, propylene and 1,4-hexadiene; etc. The additional such olefin polymers charged to the alkylation reaction will usually have number average molecular weights of at least about 900, more generally within the range of about 1200 and about 5,000, more usually between about 1500 and about 4000. Particularly useful such additional olefin polymers have number average molecular weights within the range of about 1500 and about 3000 with approximately one double bond per chain. An especially useful additional such polymer is polyisobutylene. Preferred are mixtures of such polyisobutylene with ethylene-propylene copolymers wherein at least 30 wt % of the copolymer chains contain terminal ethenylene monounsaturation as described above.

The number average molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography", John Wiley and Sons, New York, 1979.

THE N-HYDROXYARYL AMINE MATERIAL

The N-hydroxyaryl amines employed in this invention can comprise any aromatic compound having at least one hydroxy group and at least one amine-containing group substituted on at least one ring of the aromatic compound. The N-hydroxyaryl amines which are preferred in this invention comprise N-hydroxyaryl mono-primary amines of the formula (IVa):

$H_2N$—Ar—OH wherein Ar represents

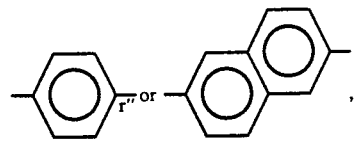

and wherein r" is 1 or 2, and alkyl- and halide-substituted derivatives thereof, wherein from 1 to 3 ring carbon atoms are substituted by a hydrocarbyl group or halide atom. Illustrative of such Ar groups are phenylene,

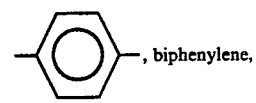, biphenylene,

, naphthylene,

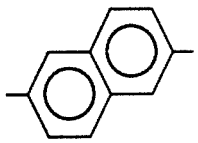

and the like. The Ar group may be substituted with 1 to 3, preferably 1 to 2, hydrocarbyl groups, e.g., alkyl groups containing 1 to 20 carbon atoms, or with 1 to 3 halogen radicals, e.g., chloro-, bromo-, or iodo-.

Preferred N-hydroxyaryl amine reactants are amino phenols of the formula:

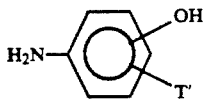

in which T' is hydrogen, an alkyl radical having from 1 to 3 carbon atoms or a halogen radical such as the chloride or bromide radical.

Suitable aminophenols include 2-aminophenol, 3-aminophenol, 4-aminophenol, 4-amino-3-methylphenol, 4-amino-3-chlorophenol, 4-amino-2-bromophenol and 4-amino-3-ethylphenol.

Suitable amino-substituted polyhydroxyaryls are the aminocatechols, the amino resorcinols, and the aminohydroquinones, e.g., 4-amino-1,2-dihydroxybenzene, 3-amino-1,2-dihydroxybenzene, 5-amino-1,3-dihydroxybenzene, 4-amino-1,3-dihydroxybenzene, 2-amino-1,4-dihydroxybenzene, 3-amino-1,4-dihydroxybenzene and the like.

Suitable aminonaphthols include 1-amino-5-hydroxynaphthalene, 1-amino-3-hydroxynaphthalene and the like.

Amine Compounds

Amine compounds useful as reactant (D) in the present invention include mono- and (preferably) polyamines, of about 2 to 60, preferably 2 to 40 (e.g. 3 to 20), total carbon atoms and about 1 to 12, preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

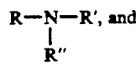 (Va)

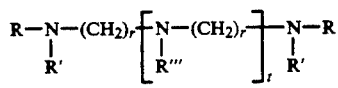 (Vb)

wherein R, R', R" and R"' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; and wherein R"' can additionally comprise a moiety of the formula:

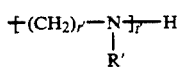 (VI)

wherein R' is as defined above, and wherein r and r' can be the same or a different number of from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R"', r, r', t and t, be selected in a manner sufficient to provide the compounds of Formulas Va and Vb with typically at least one primary or secondary amine group, preferably at least two primary or secondary amine groups. This can be achieved by selecting at least one of said R, R', R" or R"' groups to be hydrogen or by letting t in Formula Vb be at least one when R"' is H or when the VI moiety possesses a secondary amino group. The most preferred amine of the above formulas are represented by Formula Vb and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diaminopropane; N,N-di-(2-aminoethyl) ethylene diamine; N,N-di (2-hydroxyethyl) -1,3-propylene diamine; 3-dodecyloxypropylamine; N-dodecyl-1,3-propane diamine; tris hydroxymethylaminomethane (THAM); diisopropanol amine: diethanol amine; triethanol amine; mono-, di-, and tri-tallow amines; amino morpholines such as N-(3-aminopropyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (VII):

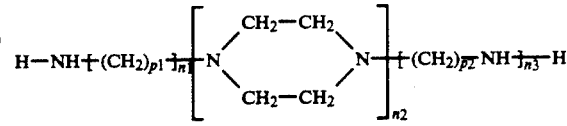

wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formula (VIII):

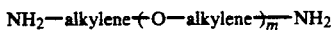

where m has a value of about 3 to 70 and preferably 10 to 35; and the formula (IX):

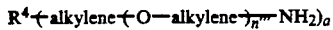

where n''' has a value of about 1 to 40 with the provision that the sum of all the n'''values is from about 3 to about 70 and preferably from about 6 to about 35, and $R^4$ is a polyvalent saturated hydrocarbon radical of up to ten carbon atoms wherein the number of substituents on the $R^4$ group is represented by the value of "a", which is a number of from 3 to 6. The alkylene groups in either formula (VII) or (IX) may be straight or branched chains containing about 2 to 7, and preferably about 2 to 4 carbon atoms.

The polyoxyalkylene polyamines of formulas (VII) or (IX) above, preferably polyoxyalkylene diamines and polyoxyalkylene triamines, may have average molecular weights ranging from about 200 to about 4000 and preferably from about 400 to about 2000. The preferred polyoxyalkylene polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

A particularly useful class of amines are the polyamido and related amines disclosed in co-pending Ser. No. 126,405, filed Nov. 30, 1987, which comprise reaction products of a polyamine and an alpha, beta unsaturated compound of the formula:

wherein X is sulfur or oxygen, Y is —$OR^8$, —$SR^8$, or —$NR^8(R^9)$, and $R^5$, $R^6$, $R^7$, $R^8$ and $R^9$ are the same or different and are hydrogen or substituted or unsubstituted hydrocarbyl. Any polyamine, whether aliphatic, cycloaliphatic, aromatic, heterocyclic, etc., can be employed provided it is capable of adding across the acrylic double bond and amidifying with for example the carbonyl group (—C(O)—) of the acrylate-type compound of formula X, or with the thiocarbonyl group (—C(S)—) of the thioacrylate-type compound of formula X.

When $R^5$, $R^6$, $R^7$, $R^8$ or $R^9$ in Formula X are hydrocarbyl, these groups can comprise alkyl, cycloalkyl, aryl, alkaryl, aralkyl or heterocyclic, which can be substituted with groups which are substantially inert to any component of the reaction mixture under conditions selected for preparation of the amido-amine. Such substituent groups include hydroxy, halide (e.g., Cl, Fl, I, Br), —SH and alkylthio. When one or more of $R^5$ through $R^9$ are alkyl, such alkyl groups can be straight or branched chain, and will generally contain from 1 to 20, more usually from 1 to 10, and preferably from 1 to 4, carbon atoms. Illustrative of such alkyl groups are methyl, ethyl, propyl, butyl, pentyl, hexyl, heptyl, octyl, nonyl, decyl, dodecyl, tridecyl, hexadecyl, octadecyl and the like. When one or more of $R^5$ through $R^9$ are aryl, the aryl group will generally contain from 6 to 10 carbon atoms (e.g., phenyl, naphthyl).

When one or more of $R^5$ through $R^9$ are alkaryl, the alkaryl group will generally contain from about 7 to 20 carbon atoms, and preferably from 7 to 12 carbon atoms. Illustrative of such alkaryl groups are tolyl, m-ethylphenyl, o-ethyltolyl, and m-hexyltolyl. When one or more of $R^5$ through $R^9$ are aralkyl, the aryl component generally consists of phenyl or ($C_1$ to $C_6$) alkyl-substituted phenol and the alkyl component generally contains from 1 to 12 carbon atoms, and preferably from 1 to 6 carbon atoms. Examples of such aralkyl groups are benzyl, o-ethylbenzyl, and 4-isobutylbenzyl. When one or more of $R^5$ and $R^9$ are cycloalkyl, the cycloalkyl group will generally contain from 3 to 12 carbon atoms, and preferably from 3 to 6 carbon atoms. Illustrative of such cycloalkyl groups are cyclopropyl, cyclobutyl, cyclohexyl, cyclooctyl, and cyclododecyl. When one or more of $R^5$ through $R^9$ are heterocyclic, the heterocyclic group generally consists of a compound having at least one ring of 6 to 12 members in which on or more ring carbon atoms is replaced by oxygen or nitrogen. Examples of such heterocyclic groups are furyl, pyranyl, pyridyl, piperidyl, dioxanyl, tetrahydrofuryl, pyrazinyl and 1,4-oxazinyl.

The alpha, beta ethylenically unsaturated carboxylate compounds employed herein have the following formula:

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate compounds of formula XI are acrylic acid, methacrylic acid, the methyl, ethyl, isopropyl, n-butyl, and isobutyl esters of acrylic and methacrylic acids, 2-butenoic acid, 2-hexenoic acid, 2-decenoic acid , 3-methyl -2 -heptenoic acid, 3-methyl-2-butenoic acid, 3-phenyl-2-propenoic acid, 3-cyclohexyl-2-butenoic acid, 2-methyl-2-butenoic acid, 2-propyl-2-propenoic acid, 2-isopropyl-2-hexenoic acid, 2,3-dimethyl-2-butenoic acid , 3-cyclohexyl-2-methyl-2-pentenoic acid, 2-propenoic acid, methyl 2-propenoate, methyl 2-methyl 2-propenoate, methyl 2-butenoate, ethyl 2-hexenoate, isopropyl 2-decenoate, phenyl 2-pentenoate, tertiary butyl 2-propenoate, octadecyl 2 -propenoate, dodecyl 2-decenoate, cyclopropyl 2,3-dimethyl-2-butenoate, methyl 3-phenyl-2-propenoate, and the like.

The alpha, beta ethylenically unsaturated carboxylate thioester compounds employed herein have the following formula:

wherein $R^5$, $R^6$, $R^7$, and $R^8$ are the same or different and are hydrogen or substituted or unsubstituted hydrocarbyl as defined above. Examples of such alpha, beta-ethylenically unsaturated carboxylate thioesters of formula XII are methylmercapto 2-butenoate, ethylmercapto 2-hexenoate, isopropylmercapto 2-decenoate, phenylmercapto 2-pentenoate, tertiary butylmercapto 2-propenoate, octadecylmercapto 2-propenoate, dodecylmercapto 2-decenoate, cyclopropylmercapto 2,3-dimethyl-2-butenoate, methylmercapto 3-phenyl-2-propenoate, methylmercapto 2-propenoate, methylmercapto 2-methyl-2-propenoate, and the like.

The alpha, beta ethylenically unsaturated carboxyamide compounds employed herein have the following formula:

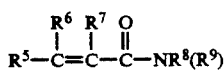
(XIII)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated carboxyamides of formula XIII are 2-butenamide, 2-hexenamide, 2-decenamide, 3-methyl-2-heptenamide, 3-methyl-2-butenamide, 3-phenyl-2-propenamide, 3-cyclohexyl-2-butenamide, 2-methyl-2-butenamide, 2-propyl-2-propenamide, 2-isopropyl-2-hexenamide, 2,3-dimethyl-2-butenamide, 3-cyclohexyl-2-methyl-2-pentenamide, N-methyl 2-butenamide, N-methyl 2-butenamide, N,N-diethyl 2-hexenamide, N-isopropyl 2-decenamide, N-phenyl 2-pentenamide, N-tertiary butyl 2-propenamide, N-octadecyl 2-propenamide, N-N-didodecyl 2-decenamide, N-cyclopropyl 2,3-dimethyl-2-butenamide, N-methyl 3-phenyl-2-propenamide, 2-propenamide, 2-methyl-2-propenamide, 2-ethyl-2-propenamide and the like.

The alpha, beta ethylenically unsaturated thiocarboxylate compounds employed herein have the following formula:

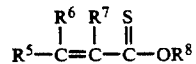
(XIV)

where in $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxylate compounds of formula XIV are 2-butenthioic acid, 2-hexenthioic acid, 2-decenthioic acid, 3-methyl-2-heptenthioic acid, 3-methyl-2-butenthioic acid, 3-phenyl-2-propenthioic acid, 3-cyclohexyl-2-butenthioic acid, 2-methyl-2-butenthioic acid, 2-propyl-2-propenthioic acid, 2-isopropyl-2-hexenthioic acid, 2,3-dimethyl-2-butenthioic acid, 3-cyclohexyl-2-methyl-2-pententhioic acid, 2-propenthioic acid, methyl 2-propenthioate, methyl 2-methyl 2-propenthioate, methyl 2-butenthioate, ethyl 2-hexenthioate, isopropyl 2-decenthioate, phenyl 2-pententhioate, tertiary butyl 2-propenthioate, octadecyl 2-propenthioate, dodecyl 2-decenthioate, cyclopropyl 2,3-dimethyl-2-butenthioate, methyl 3-phenyl-2-propenthioate, and the like.

The alpha, beta ethylenically unsaturated dithioic acid and acid ester compounds employed herein have the following formula:

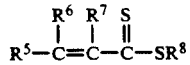
(XV)

wherein $R^5$, $R^6$, $R^7$, and $R^8$ are the same or different and are hydrogen or substituted or unsubstituted hydrocarbyl as defined above. Examples of alpha, beta-ethylenically unsaturated dithioic acids and acid esters of formula XV are 2-butendithioic acid, 2-hexendithioic acid, 2-decendithioic acid, 3-methyl-2-heptendithioic acid, 3-methyl-2-butendithioic acid, 3-phenyl-2-propendithioic acid, 3-cyclohexyl-2-butendithioic acid, 2-methyl-2-butendithioic acid, 2-propyl-2-propendithioic acid, 2-isopropyl-2-hexendithioic acid, 2,3-dimethyl-2-butendithioic acid, 3-cyclohexyl-2-methyl-2-pentendithioic acid, 2-propendithioic acid, methyl 2-propendithioate, methyl 2-methyl 2-propendithioate, methyl 2-butendithioate, ethyl 2-hexendithioate, isopropyl 2-decendithioate, phenyl 2-pentendithioate, tertiary butyl 2-propendithioate, octadecyl 2-propendithioate, dodecyl 2-decendithioate, cyclopropyl 2,3-dimethyl-2-butendithioate, methyl 3-phenyl-2-propendithioate, and the like.

The alpha, beta ethylenically unsaturated thiocarboxyamide compounds employed herein have the following formula:

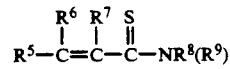
(XVI)

wherein $R^5$, $R^6$, $R^7$, $R^8$ and $R^9$ are the same or different and are hydrogen or substituted or unsubstituted hydrocarbyl as defined above. Examples of alpha, beta-ethylenically unsaturated thiocarboxyamides of formula XVI are 2-butenthioamide, 2-hexenthioamide, 2-decenthioamide, 3-methyl-2-heptenthioamide, 3-methyl-2-butenthioamide, 3-phenyl-2-propenthioamide, 3-cyclohexyl-2-butenthioamide, 2-methyl-2-butenthioamide, 2-propyl-2-propenthioamide, 2-isopropyl-2-hexenthioamide, 2,3-dimethyl-2-butenthioamide, 3-cyclohexyl-2-methyl-2-pententhioamide, N-methyl 2-butenthioamide, N,N-diethyl 2-hexenthioamide, N-isopropyl 2-decenthioamide, N-phenyl 2-pententhioamide, N-tertiary butyl 2-propenthioamide, N-octadecyl 2-propenthioamide, N-N-didodecyl 2-decenthioamide, N-cyclopropyl 2,3-dimethyl-2-butenthioamide, N-methyl 3-phenyl-2-propenthioamide, 2-propenthioamide, 2-methyl-2-propenthioamide, 2-ethyl-2-propenthioamide and the like.

Preferred compounds for reaction with the polyamines in accordance with this invention are lower alkyl esters of acrylic and (lower alkyl) substituted acrylic acid. Illustrative of such preferred compounds are compounds of the formula:

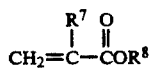
(XVII)

where $R^7$ is hydrogen or a $C_1$ to $C_4$ alkyl group, such as methyl, and $R^8$ is hydrogen or a $C_1$ to $C_4$ alkyl group, capable of being removed so as to form an amido group, for example, methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate. When the selected alpha, beta-unsaturated compound comprises a compound of formula X wherein X' is oxygen, the resulting reaction product with the polyamine contains at least one amido linkage (—C(O)N<) and such materials are herein termed "amido-amines." Similarly, when the selected alpha, beta unsaturated compound of formula X comprises a compound wherein X' is sulfur, the resulting reaction product with the polyamine contains thioamide linkage (—C(S)N<) and these materials are herein termed "thioamido-amines." For convenience, the following discussion is directed to the preparation and use of amido-amines, although it will be understood that such discussion is also applicable to the thioamido-amines.

The type of amido-amine formed varies with reaction conditions. For example, a more linear amido-amine is formed where substantially equimolar amounts of the unsaturated carboxylate and polyamine are reacted. The presence of excesses of the ethylenically unsaturated reactant of formula X tends to yield an amido-amine which is more cross-linked than that obtained where substantially equimolar amounts of reactants are employed. Where for economic or other reasons a cross-linked amido-amine using excess amine is desired, generally a molar excess of the ethylenically unsaturated reactant of about at least 10%, such as 10–300%, or greater, for example, 25–200%, is employed. For more efficient cross-linking an excess of carboxylated material should preferably be used since a cleaner reaction ensues. For example, a molar excess of about 10–100% or greater such as 10–50%, but preferably an excess of 30–50%, of the carboxylated material. Larger excess can be employed if desired.

In summary, without considering other factors, equimolar amounts of reactants tend to produce a more linear amido-amine whereas excess of the formula XII reactant tends to yield a more cross-linked amido-amine. It should be noted that the higher the polyamine (i.e., in greater the number of amino groups on the molecule) the greater the statistical probability of cross-linking since, for example, a tetraalkylenepentamine, such as tetraethylene pentamine

has more labile hydrogens than ethylene diamine.

These amido-amine adducts so formed are characterized by both amido and amino groups. In their simplest embodiments they may be represented by units of the following idealized formula (XVIII):

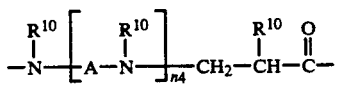

wherein the $R^{10}$'s, which may be the same or different, are hydrogen or a substituted group, such as a hydrocarbon group, for example, alkyl, alkenyl, alkynyl, aryl, etc., and A is a moiety of the polyamine which, for example, may be aryl, cycloalkyl, alkyl, etc., and $n_4$ is an integer such as 1–10 or greater.

The above simplified formula represents a linear amido-amine polymer. However, cross-linked polymers may also be formed by employing certain conditions since the polymer has labile hydrogens which can further react with either the unsaturated moiety by adding across the double bond or by amidifying with a carboxylate group.

Preferably, however, the amido-amines employed in this invention are not cross-linked to any substantial degree, and more preferably are substantially linear.

Preferably, the polyamine reactant contains at least one primary amine (and more preferably from 2 to 4 primary amines) group per molecule, and the polyamine and the unsaturated reactant of formula X are contacted in an amount of from about 1 to 10, more preferably from about 2 to 6, and most preferably from about 3 to 5, equivalents of primary amine in the polyamine reactant per mole of the unsaturated reactant of formula X.

The reaction between the selected polyamine and acrylate-type compound is carried out at any suitable temperature. Temperatures up to the decomposition points of reactants and products can be employed. In practice, one generally carries out the reaction by heating the reactants below 100° C., such as 80–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of low boiling alcohols such as methanol or ethanol. As the reaction slows, the temperature is raised to push the polymerization to completion and the temperature may be raised to 150° C. toward the end of the reaction. Removal of alcohol is a convenient method of judging the progress and completion of the reaction which is generally continued until no more alcohol is evolved. Based on removal of alcohol, the yields are generally stoichiometric. In more difficult reactions, yield of at least 95% are generally obtained.

Similarly, it will be understood that the reaction of an ethylenically unsaturated carboxylate thioester of formula XII liberates the corresponding $HSR^8$ compound (e.g., $H_2S$ when $R^8$ is hydrogen) as a by-product, and the reaction of an ethylenically unsaturated carboxyamide of formula XIII liberates the corresponding $HNR^8(R^9)$ compound (e.g., ammonia when $R^8$ and $R^9$ are each hydrogen) as by-product.

The reaction time involved can vary widely depending on a wide variety of factors. For example, there is a relationship between time and temperature. In general, lower temperature demands longer times. Usually, reaction times of from about 2 to 30 hours, such as 5 to 25 hours, and preferably 3 to 10 hours will be employed.

Although one can employ a solvent, the reaction can be run without the use of any solvent. In fact, where a high degree of cross-linking is desired, it is preferred to avoid the use of a solvent and most particularly to avoid a polar solvent such as water. However, taking into consideration the effect of solvent on the reaction, where desired, any suitable solvent can be employed, whether organic or inorganic, polar or non-polar.

As an example of the amido-amine adducts, the reaction of tetraethylene pentaamine (TEPA) with methyl methacrylate can be illustrated as follows:

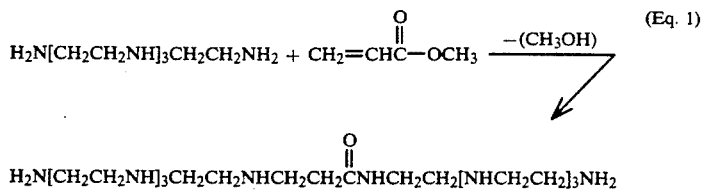

(Eq. 1)

The Aldehyde Material

The aldehyde reactants will generally comprise formaldehyde or paraformaldehyde, although it will be understood that other aldehyde-group containing compounds, such as $C_2$ to $C_{10}$ hydrocarbyl aldehydes (e.g., butyraldehyde, acetaldehyde, propionaldehyde, and the like) can also be employed. A preferred group of aldehyde materials are compounds of the formula: R″CHO, wherein R″ is H or aliphatic hydrocarbon radical having from 1 to 4 carbon atoms.

Preparation of the Polymer Dispersants

In one preferred aspect of this invention, the novel dispersants of this invention are prepared by reacting the ethylene-alpha olefin polymer substituted mono- or dicarboxylic acid material with the N-hydroxyaryl amine material to form a carbonyl-amino material containing at least one group having a carbonyl group bonded to a secondary or a tertiary nitrogen atom. In the amide form, the carbonyl-amino material can contain 1 or 2 —C(O)—NH—groups, and in the imide form the carbonyl-amino material will contain —C(O)—N—C(O)— groups. The carbonyl-amino material can therefore comprise N-(hydroxyaryl) polymer- substituted dicarboxylic acid diamide, N-(hydroxyaryl) polymer-substituted dicarboxylic acid imide, N-(hydroxyaryl) polymer substituted-monocarboxylic acid monoamide, N-(hydroxyaryl) polymer-substituted dicarboxylic acid monoamide or a mixture thereof.

In general, equimolar amounts of the ethylene-alpha olefin polymer substituted mono- or dicarboxylic acid material, such as ethylene-alpha olefin polymer substituted succinic anhydride, and of the N-hydroxyaryl amine, such as p-aminophenol, are dissolved in an inert solvent (i.e. a hydrocarbon solvent such as toluene, xylene, or isooctane) and reacted at a moderately elevated temperature up to the reflux temperature of the solvent used, for sufficient time to complete the formation of the intermediate N-(hydroxyaryl) hydrocarbyl amide or imide. When an ethylene-alpha olefin polymer substituted monocarboxylic acid material is used, the resulting intermediate which is generally formed comprises amide groups. Similarly, when an ethylene-alpha olefin polymer substituted dicarboxylic acid material is used, the resulting intermediate generally comprises imide groups, although amide groups can also be present in a portion of the carbonyl-amino material thus formed. Thereafter, the solvent is removed under vacuum at an elevated temperature, generally, at approximately 160° C. (1 mm).

Alternatively, the intermediate is prepared by combining equimolar amounts of the ethylene-alpha olefin polymer substituted mono- or dicarboxylic acid material and the N-(hydroxyaryl) amine and heating the resulting mixture at elevated temperature under a nitrogen purge in the absence of solvent.

The resulting N-(hydroxyaryl) polymer substituted imides can be illustrated by the succinimides of the formula (XIX):

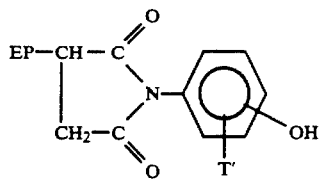

wherein T′ is as defined above, and wherein EP represents the polymer substituent group derived from the ethylene-alpha-olefin polymer (e.g., ethylene-propylene copolymer). Similarly, when the ethylene-alpha olefin polymer substituted monocarboxylic acid material is used, the resulting N-(hydroxyaryl) polymer substituted amides can be represented by the propionamides of the formula (XX):

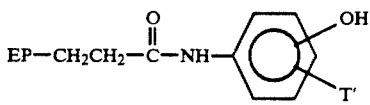

wherein T′ and EP are as defined above.

In the second step of this preferred aspect of the invention, the carbonyl-amino intermediate is reacted with an amine compound (or mixture of amine compounds), such as a polyfunctional amine, together with an aldehyde (e.g., formaldehyde) in the Mannich base reaction. In general, the reactants are admixed and reacted at an elevated temperature until the reaction is complete. This reaction may be conducted in the presence of a solvent and in the presence of a quantity of mineral oil which is an effective solvent for the carbonyl-amino intermediate and for the finished Mannich base dispersant material. This second step can be illustrated by the Mannich base reaction between the above N-(hydroxyphenyl) polymer succinimide intermediate, paraformaldehyde and ethylene diamine in accordance with the following equation:

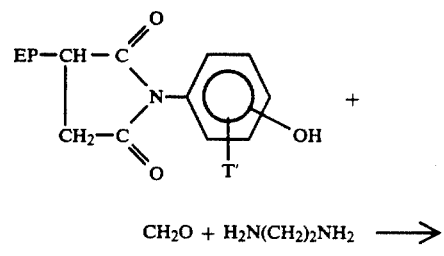

(Eq. 2)

-continued

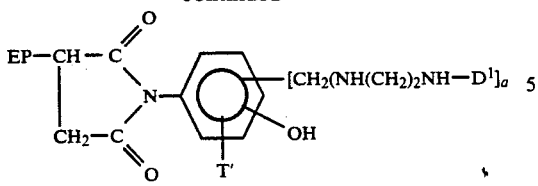 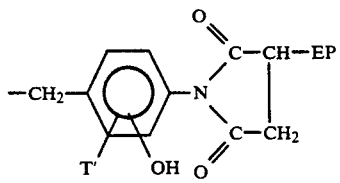

wherein a is an integer of 1 or 2, EP and T' are as defined above, $D^1$ is H when "a" is 2, and $D^1$ is H or the moiety

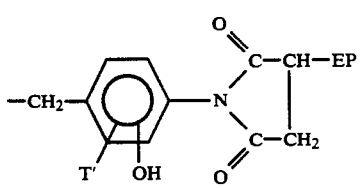

when "a" is 1. Similarly, this second step can be illustrated by the Mannich base reaction between the above N-(hydroxyphenyl) polymer acrylamide intermediate, paraformaldehyde and ethylene diamine in accordance with the following equation:

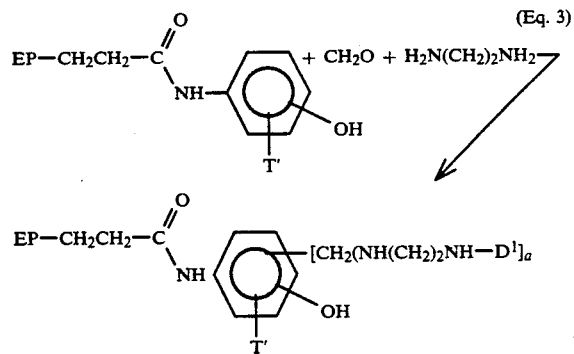

wherein a is an integer of 1 or 2, EP and R' are defined above, $D^2$ is H when "a" is 2, and $D^2$ is H or the moiety

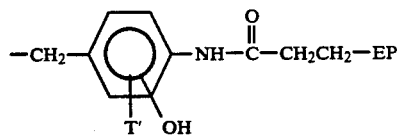

when "a" is 1.

Generally, the reaction of one mole of the carbonyl-amino material, e.g. a N-(hydroxyaryl) polymer succimide or amide intermediate, with two moles of aldehyde and one mole of amine will favor formation of the products comprising two moieties of bridged by an -alk-amine-alk-group wherein the "alk" moieties are derived from the aldehyde (e.g., —CH$_2$— from CH$_2$O) and the "amine" moiety is a bivalent bis-N terminated amino group derived from the amine reactant (e.g., from polyalkylene polyamine). Such products are illustrated by Equations 2 and 3 above wherein "a" is one, $D^1$ is the moiety and $D^2$ is the moiety

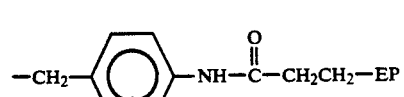

wherein T' and EP are as defined above.

In a similar manner, the reaction of substantially equimolar amounts of the carbonyl-amino material, aldehyde and amine reactant favors the formation of products illustrated by Equations 2 and 3 wherein "a" is one and $D^1$ and $D^2$ are each H, and the reaction of one mole of carbonyl-amino material with two moles of aldehyde and two mole of the amine reactant permits the formation of increased amounts of the products illustrated by Equations 2 and 3 wherein "a" is two and $D^1$ and $D^2$ are each H.

In still other aspects of the invention, the order of reacting the various reactants is modified such that, for example, the N-hydroxyaryl amine is first admixed and reacted with the amine material and aldehyde in the Mannich base reaction to form an aminomethyl hydroxyaryl amine material. Thereafter, the resulting intermediate adduct is reacted with the ethylene-alpha-olefin polymer substituted mono- or dicarboxylic acid material to form the desired dispersant. The sequence of reactions performed in accordance with this aspect of the invention tends to result in the formation of various dispersant isomers because of the plurality of aromatic materials formed in the first Mannich base condensation step and the primary and secondary nitrogen atoms which are available for reaction with the carboxy moieties of the mono- or dicarboxylic acid materials.

The Mannich base intermediate adduct formed by the reaction of the N-hydroxyaryl amine with the amine reactant and formaldehyde can comprise at least one compound selected from the group consisting of:

(a) adducts of the structure (XXI):

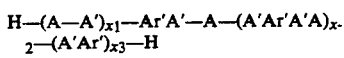

wherein $x_1$ is 0 or 1, $x_2$ is an integer of 0 to 8, $x_3$ is 0 or 1, "A" is a bivalent bis-N terminated amino group derived from the amine reactant and comprises an amine group containing from 2 to 60 (preferably from 2 to 40) carbon atoms and from 1 to 12 (preferably from 3 to 13) nitrogen atoms, and A' comprises the group —CH(T'-')— wherein T" is H or alkyl of from 1 to 9 carbon atoms and is derived from the corresponding aldehyde reactant, and Ar' comprises the moiety (XXII):

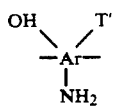

wherein T' and Ar are as defined above for the N-hydroxyaryl amines employed in this invention; and
(b) adducts of the structure (XXIII):

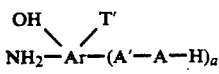

wherein "a", T', A', A and Ar are as defined above. Preferred adducts of formula XXI above are those wherein $x_1$ is 0, $x_2$ is 1 to 3, and $x_3$ is 1, and most preferably wherein T' is H or alkyl of 1 to 3 carbon atoms, Ar is phenylene. Preferred adducts of formula XXIII are those wherein Ar is phenylene.

Preferably, the "A" bivalent amino group will comprise terminal —NH— groups, as exemplified by the structures of the formula (XXIV):

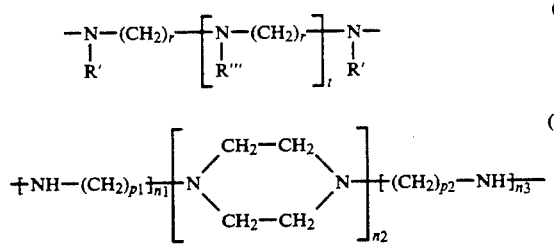

-continued

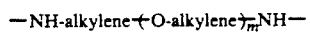

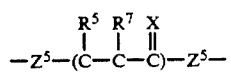

wherein $Z^5$ comprises at least one member selected from the group consisting of (XXIV)(i), (ii) and (iii) above,
wherein R', R" and "r" are as defined above with respect to Formula Vb; p, $p_2$, $n_1$ and $n_2$ are as defined above with respect to Formula Vb; "alkylene" and "m" are as defined above with respect to Formula VIII; and $R^5$, $R^7$ and X are as defined above with respect to Formula XI.

Illustrative adducts of structure XXI are set forth in Table B below:

TABLE B

| $x_1$ | $x_2$ | $x_3$ | Ar' | A' | A |
|---|---|---|---|---|---|
| 0 | 2 | 1 | —Ph(OH)(NH$_2$)— | —CH$_2$— | —NH(CH$_2$)NH(CH$_2$)$_2$NH— |
| 0 | 2 | 1 | " | " | —NH(CH$_2$)(NH(CH$_2$))$_3$NH— |
| 0 | 1 | 0 | " | " | —NH(CH$_2$)NH(CH$_2$)$_2$NH— |
| 0 | 0 | 0 | " | " | —NH(CH$_2$)(NH(CH$_2$))$_3$NH— |
| 0 | 1 | 1 | " | " | —NH(CH$_2$)NH(CH$_2$)$_2$NH— |
| 0 | 1 | 1 | " | " | —NH(CH$_2$)(NH(CH$_2$))$_3$NH— |
| 1 | 2 | 0 | " | —CH(CH$_3$)— | —NH(CH$_2$)NH(CH$_2$)$_2$NH— |
| 1 | 0 | 1 | " | " | —NH(CH$_2$)(NH(CH$_2$))$_5$NH— |
| 1 | 3 | 0 | " | " | —NH(CH$_2$)NH(CH$_2$)$_5$NH— |
| 1 | 1 | 0 | " | " | —NH(CH$_2$)(NH(CH$_2$))$_5$NH— |
| 1 | 1 | 1 | " | " | —NH(CH$_2$)NH(CH$_2$)$_5$NH— |
| 0 | 2 | 1 | " | " | —NH(CH$_2$)(NH(CH$_2$))$_6$NH— |

(Ph = phenyl)

Illustrative adducts of structure XXIII are set forth below wherein Ar is tri- or tetra-substituted phenyl:

TABLE C

| a | T' | A' | A |
|---|---|---|---|
| 1 | H | —CH$_2$— | —NH(CH$_2$)NH(CH$_2$)$_2$NH— |
| 2 | CH$_3$ | " | —NH(CH$_2$)(NH(CH$_2$))$_3$NH— |
| 1 | CH$_3$ | " | —NH(CH$_2$)NH(CH$_2$)$_2$NH— |
| 2 | C$_2$H$_5$ | " | —NH(CH$_2$)(NH(CH$_2$))$_5$NH— |
| 1 | C$_3$H$_7$ | " | —NH(CH$_2$)NH(CH$_2$)$_5$NH— |
| 2 | C$_4$H$_9$ | " | —NH(CH$_2$)(NH(CH$_2$))$_6$NH— |
| 1 | H | —CH(CH$_3$)— | —NH(CH$_2$)NH(CH$_2$)$_4$NH— |
| 2 | CH$_3$ | " | —NH(CH$_2$)(NH(CH$_2$))$_5$NH— |

For the sake of illustration, this aspect of the invention may be represented by the following equations:

Dicarboxylic acid materials: (i)

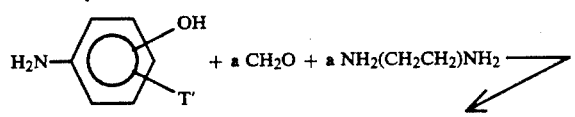

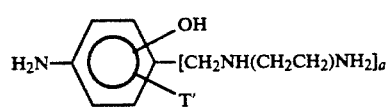

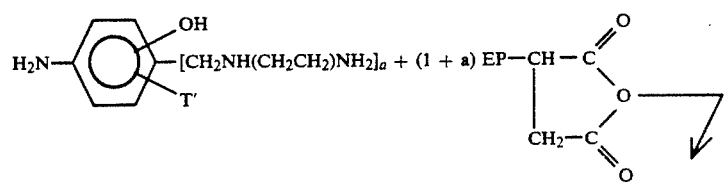

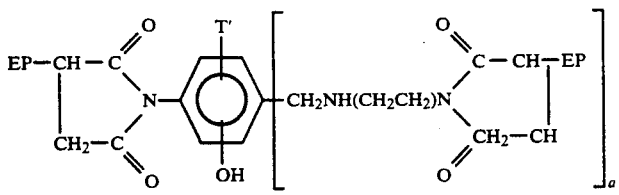

Monocarboxylic acid materials:

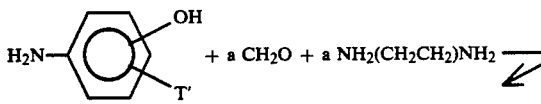

(i)

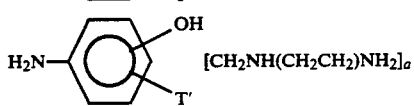

(ii)

In one preferred embodiment of the invention, a carbonyl-amino material comprising an ethylene-propylene copolymer substituted hydroxyaryl succinimide, which has been prepared by first reacting an ethylene-propylene copolymer succinic anhydride with an aminophenol to form an intermediate product, is reacted with formaldehyde and a mixture of poly(ethyleneamines) in the Mannich base reaction as outlined above to form the improved dispersants of this invention. In another preferred embodiment of the invention, an aminophenol is first reacted with formaldehyde and a mixture of poly(ethyleneamines) in the Mannich base reaction as outlined above to form an intermediate material containing from one to three (polyamino)methyl-substituted aminohydroxy aryl groups per molecule, followed by reacting this intermediate with an ethylene-propylene copolymer succinic anhydride to form the improved dispersants of this invention.

A preferred group of Mannich Base ashless dispersants are those formed by condensing ethylene-propylene copolymer with formaldehyde and polyethylene amines, e.g., tetraethylene pentamine, pentaethylene hexamine, polyoxyethylene and polyoxypropylene amines, e.g., polyoxypropylene diamine, and combinations thereof. One particularly preferred dispersant combination involves a condensation of (A) ethylene-propylene copolymer substitued succinic anhydride or propionic acid, (B) aminophenol, (C) formaldehyde, and (D) at least one of (D-1) a polyoxyalkylene polyamine, e.g., polyoxypropylene diamine, and (D-2) a polyalkylene polyamine, e.g. polyethylene diamine and tetraethylene pentamine, using a A:B:C:D molar ratio of 1:1-8:1:0.1-10, and preferably 1:2-6:1:1-4, wherein the A:(D-1):(D-2) molar ratio is 1:0-5:0-5, and preferably 1:0-4:1-4.

Most preferably, when the aldehyde comprises formaldehyde (or a material which generates formaldehdye in situ), and the amine comprises a di-primary amine (e.g., polyalkylene polyamine), the formaldehyde and diprimary amine are employed in an amount of about 2(n−1) moles of formaldehyde and about (n−1) moles of diprimary amine per "n" molar equivalents charged of the hydroxy-aryl group (whether in the form of a carbonyl-amino material, e.g. as in Formulae XIX and XX above, or in the form of an N-(hydroxyaryl) amine reactant, e.g. as in Formula IVa above).

The reaction product mixture comprising the desired ethylene-alpha-olefin substituted Mannich Base condensation product formed by the process of this invention will generally be present in the condensation reaction product mixture in a concentration of at least about 60 wt. % (e.g., from 65 to 95 wt. %), more preferably at least about 70 wt. %, from 75 to 90 wt. %, and will be generally characterized by a VR′ value ("viscosity ratio" value) of not greater than about 4.1, usually not greater than about 4.0, preferably from about 2.5 to 4.0, and most preferably from about 3.0 to 3.9. As used herein, the term "VR′ value" is intended to mean quotient determined by the expression (XXIV):

$$VR' = \frac{VISb}{VISa}$$

wherein VISa is the kinematic viscosity (KV) of the condensation reaction product mixture at 100° C. in units of centistokes (as determined by ASTM Method No. D445) and VISb is the cold cranking simulator (CCS) viscosity of the condensation reaction product mixture at −20° C. in units of poise (as determined by ASTM Method No. D2602), wherein the measurements are made upon a 2 wt % solution of the condensation reaction product mixture in an oil (herein termed the "reference oil") comprising S150N (solvent 150 neutral) mineral lubricating oil (Exxon Company U.S.A.), wherein the such reference oil is characterized by an ASTM D445 kinematic viscosity of 5.2 cSt (100° C.)

and an ASTM D2602 CCS viscosity of 19.2 poise (±0.4 poise) (at −20° C.). The "VR," value of the reference oil will then be about 3.7±0.1.

Another aspect of this invention involves the post treatment of the nitrogen containing dispersant materials. The process for post-treating said nitrogen containing dispersant materials is analogous to the post-treating processes used with respect to derivatives of conventional ethylene copolymers of the prior art. Accordingly, the same reaction conditions, ratio of reactants and the like can be used.

The nitrogen-containing dispersant materials of the instant invention as described above are post-treated by contacting said nitrogen-containing dispersant materials with one or more post-treating reagents selected from the group consisting of boron oxide, boron oxide hydrate, boron halides, boron acids, esters of boron acids, carbon disulfide, sulfur, sulfur chlorides, alkenyl cyanides, aldehydes, ketones, urea, thio-urea, guanidine, dicyanodiamide, hydrocarbyl phosphates, hydrocarbyl phosphites, hydrocarbyl thiophosphates, hydrocarbyl thiophosphites, phosphorus sulfides, phosphorus oxides, phosphoric acid, hydrocarbyl thiocyanates, hydrocarbyl isocyanates, hydrocarbyl isothiocyantes, epoxides, episulfides, formaldehyde or formaldehyde-producing compounds plus phenols, and sulfur plus phenols, and $C_1$ to $C_{30}$ hydrocarbyl substituted succinic acids and anhydrides (e.g., succinic anhydride, dodecyl succinic anhydride and the like), fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, methyl fumarate, and the like.

For example, the nitrogen containing dispersants can be treated with a boron compound selected from the class consisting of boron oxide, boron halides, boron acids and esters of boron acids in an amount to provide from about 0.1 atomic proportion of boron for each mole of said nitrogen composition to about 20 atomic proportions of boron for each atomic proportion of nitrogen of said nitrogen composition. Usefully the borated dispersants of the invention contain from about 0.05 to 2.0 wt. %, e.g. 0.05 to 0.7 wt. % boron based on the total weight of said borated nitrogen-containing dispersant compound. The boron, which appears to be in the product as dehydrated boric acid polymers (primarily $(HBO_2)_3$), is believed to attach to the dispersant as amine salts, e.g., the metaborate salt of said amine dispersants.

Treating is readily carried out by adding from about 0.05 to 4, e.g. 1 to 3 wt. % (based on the weight of said nitrogen compound) of said boron compound, preferably boric acid which is most usually added as a slurry to said nitrogen compound and heating with stirring at from about 135° C. to 190, e.g. 140–170° C., for from 1 to 5 hours followed by nitrogen stripping at said temperature ranges.

Since post-treating processes involving the use of these post-treating reagents is known insofar as application to high molecular weight nitrogen containing dispersants of the prior art, further descriptions of these processes herein is unnecessary. In order to apply the prior art processes to the compositions of this invention, all that is necessary is that reaction conditions, ratio of reactants, and the like as described in the prior art, be applied to the novel compositions of this invention. The following U.S. patents are expressly incorporated herein by reference for their disclosure of post-treating processes and post-treating reagents applicable to the compositions of this invention: U.S. Pat. Nos. 3,087,936; 3,200,107; 3,254,025; 3,256,185; 3,278,550; 3,281,428; 3,282,955; 3,284,410; 3,338,832; 3,344,069; 3,366,569; 3,373,111; 3,367,943; 3,403,102; 3,428,561; 3,502,677; 3,513,093; 3,533,945; 3,541,012; 3,639,242; 3,708,522; 3,859,318; 3,865,813; 3,470,098; 3,369,021; 3,184,411; 3,185,645; 3,245,908; 3,245,909; 3,245,910; 3,573,205; 3,692,681; 3,749,695; 3,865,740; 3,954,639; 3,458,530; 3,390,086; 3,367,943; 3,185,704, 3,551,466; 3,415,750; 3,312,619; 3,280,034; 3,718,663; 3,652,616; UK Pat. No. 1,085,903; UK Pat. No. 1,162,436; U.S. Pat. No. 3,558,743.

The nitrogen containing dispersant materials of this invention can also be treated with polymerizable lactones (such as epsilon-caprolactone) to form dispersant adducts having the moiety $-[C(O)(CH_2)_zO]_mH$, wherein z is a number of from 4 to 8 (e.g., 5 to 7) and m has an average value of from about 0 to 100 (e.g., 0.2 to 20). The dispersants of this invention can be post-treated with a $C_5$ to $C_9$ lactone, e.g., epsilon-caprolactone, by heating a mixture of the dispersant material and lactone in a reaction vessel in the absence of a solvent at a temperature of about 50° C. to about 200° C., more preferably from about 75° C. to about 180° C., and most preferably from about 90° C. to about 160° C., for a sufficient period of time to effect reaction. Optionally, a solvent for the lactone, dispersant material and/or the resulting adduct may be employed to control viscosity and/or the reaction rates.

In one preferred embodiment, the $C_5$ to $C_9$ lactone, e.g., epsilon-caprolactone, is reacted with a dispersant material in a 1:1 mole ratio of lactone to dispersant material. In practice, the ration of lactone to dispersant material may vary considerably as a means of controlling the length of the sequence of the lactone units in the adduct. For example, the mole ratio of the lactone to the dispersant material may vary from about 10:1 to about 0.1:1, more preferably from about 5:1 to about 0.2:1, and most preferably from about 2:1 to about 0.4:1. It is preferable to maintain the average degree of polymerization of the lactone monomer below about 100, with a degree of polymerization on the order of from about 0.2 to about 50 being preferred, and from about 0.2 to about 20 being more preferred. For optimum dispersant performance, sequences of from about 1 to about 5 lactone units in a row are preferred.

Catalysts useful in the promotion of the lactone-dispersant material reactions are selected from the group consisting of stannous octanoate, stannous hexanoate, tetrabutyl titanate, a variety of organic based acid catalysts and amine catalysts, as described on page 266, and forward, in a book chapter authored by R. D. Lundberg and E. F. Cox, entitled "Kinetics and Mechanisms of Polymerization: Ring Opening Polymerization", edited by Frisch and Reegen, published by Marcel Dekker in 1969, wherein stannous octanoate is an especially preferred catalyst. The catalyst is added to the reaction mixture at a concentration level of about 50 to about 10,000 parts per weight of catalyst per one million parts of the total reaction mixture.

Exemplary of adducts formed by reaction of dispersant materials if this invention and epsiloncaprolactone are those adducts illustrated by the following equation:

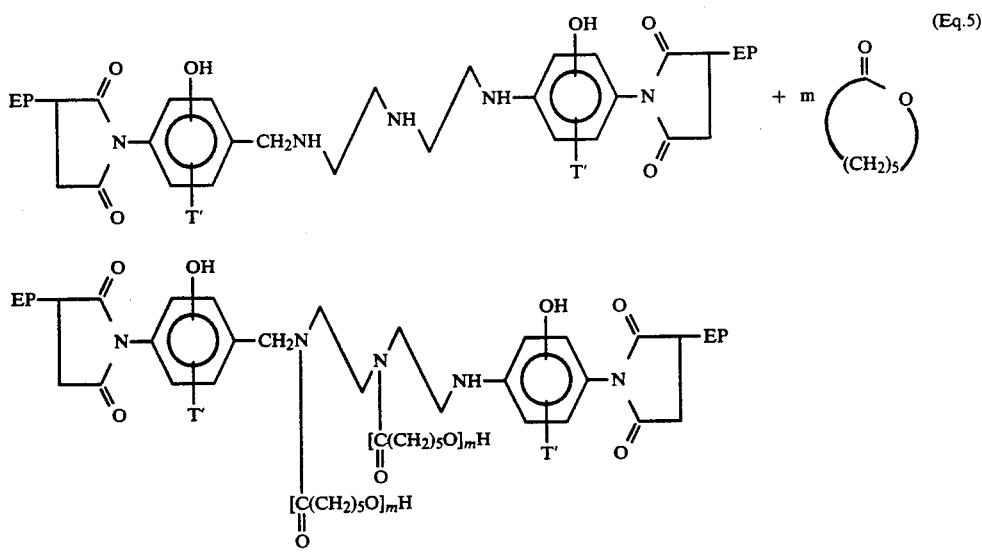

(Eq.5)

wherein m and EP are as defined above. The reactions of such lactones with dispersant materials containing nitrogen or ester groups is more completely described in copending applications Ser. Nos. 916,108; 916,217; 916,218; 916,287; 916,303; 916,113; and 916,114, all filed on Oct. 7, 1986; and co-pending Ser. No. 178,099 filed on Apr. 6, 1988; the disclosure of each of which is hereby incorporated by reference in its entirety.

Further aspects of the present invention reside in the formation of metal complexes of the novel dispersant additives prepared in accordance with this invention. Suitable metal complexes may be formed in accordance with known techniques of employing a reactive metal ion species during or after the formation of the present dispersant materials. Complex forming metal reactants include the metal nitrates, thiocyanates, halides, carboxylates, phosphates, thio-phosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be also found in U.S. Pat. Nos. 3,306,908 and Re. 26,433, the disclosures of which are hereby incorporated by reference in their entirety.

The processes of these incorporated patents, as applied to the compositions of this invention, and the post-treated compositions thus produced constitute a further aspect of this invention.

The dispersants of the present invention can be incorporated into a lubricating oil in any convenient way. Thus, these mixtures can be added directly to the oil by dispersing or dissolving the same in the oil at the desired level of concentrations of the dispersant and detergent, respectively. Such blending into the additional lube oil can occur at room temperature or elevated temperatures. Alternatively, the dispersants can be blended with a suitable oil-soluble solvent and base oil to form a concentrate, and then blending the concentrate with a lubricating oil basestock to obtain the final formulation. Such dispersant concentrates will typically contain (on an active ingredient (A.I.) basis) from about 20 to about 60 wt. %, and preferably from about 40 to about 50 wt. %, dispersant additive, and typically from about 40 to 80 wt. %, preferably from about 40 to 60 wt. %, base oil, based on the concentrate weight.

The lubricating oil basestock for the dispersant typically is adapted to perform a selected function by the incorporation of additional additives therein to form lubricating oil compositions (i.e., formulations).

The lubricating oil basestock for the dispersant typically is adapted to perform a selected function by the incorporation of additional additives therein to form lubricating oil compositions (i.e., formulations).

LUBRICATING COMPOSITIONS

The additive mixtures of the present invention possess very good dispersant properties as measured herein in a wide variety of environments. Accordingly, the additive mixtures are used by incorporation and dissolution into an oleaginous material such as fuels and lubricating oils. When the additive mixtures of this invention are used in normally liquid petroleum fuels such as middle distillates boiling from about 65° to 430° C., including kerosene, diesel fuels, home heating fuel oil, jet fuels, etc., a concentration of the additives in the fuel in the range of typically from about 0.001 to about 0.5, and preferably 0.005 to about 0.15 weight percent, based on the total weight of the composition, will usually be employed.

The additive mixtures of the present invention find their primary utility in lubricating oil compositions which employ a base oil in which the additives re dissolved or dispersed. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixture s of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive mixtures of the present invention.

These lubricating oil formulations conventionally contain several different types of additives that will supply the characteristics that are required in the formulations. Among these types of additives are included viscosity index improvers, antioxidants, corrosion inhibitors, detergents, dispersants, pour point depressants, antiwear agents, friction modifiers, etc.

In the preparation of lubricating oil formulations it is common practice to introduce the additives in the form of 10 to 80 wt. %, e.g., 20 to 80 wt. % active ingredient concentrates in hydrocarbon oil, e.g. mineral lubricating oil, or other suitable solvent. Usually these concentrates may be diluted with 3 to 100, e.g., 5 to 40 parts by weight of lubricating oil, per part by weight of the additive package, in forming finished lubricants, e.g. crankcase motor oils. The purpose of concentrates, of course, is to make the handling of the various materials less difficult and awkward as well as to facilitate solution or dispersion in the final blend. Thus, a dispersant would be usually employed in the form of a 40 to 50 wt. % concentrate, for example, in a lubricating oil fraction.

The ashless dispersants of the present invention will be generally used in admixture with a lube oil basestock, comprising an oil of lubricating viscosity, including natural and synthetic lubricating oils and mixtures thereof.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-poly isopropylene glycol ether having an average molecular weight of 1000, diphenyl ether of poly-ethylene glycol having a molecular weight of 500–1000, diethyl ether of polypropylene glycol having a molecular weight of 1000–1500) ; and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxane oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tertbutylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

Metal containing rust inhibitors and/or detergents are frequently used with ashless dispersants. Such detergents and rust inhibitors include the metal salts of sulphonic acids, alkyl phenols, sulphurized alkyl phenols, alkyl salicylates, naphthenates, and other oil soluble mono- and di-carboxylic acids. Highly basic, that is overbased metal salts which are frequently used as detergents appear particularly prone to interaction with the ashless dispersant. Usually these metal containing rust inhibitors and detergents are used in lubricating oil in amounts of about 0.01 to 10, e.g. 0.1 to 5 wt. %, based on the weight of the total lubricating composition. Marine diesel lubricating oils typically employ such metal-containing rust inhibitors and detergents in amounts of up to about 20 wt. %.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronaphthalene. The alkylation may be carried out in the presence of a catalyst with alkylating agents having from about 3 to more than 30 carbon atoms. For example haloparaffins, olefins obtained by dehydrogenation of paraffins, polyolefins produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, and barium. Examples are calcium oxide, calcium hydroxide, magnesium acetate and magnesium borate. As noted, the alkaline earth metal compound is used in excess of that required to complete neutralization of the alkaryl sulfonic acids. Generally, the amount ranges from about 100 to 220%, although it is preferred to use at least 125%, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a total base number ranging from about 300 to about 400 with the magnesium sulfonate content ranging from about 25 to about 32 wt. %, based upon the total weight of the additive system dispersed in mineral lubricating oil.

Neutral metal sulfonates are frequently used as rust inhibitors. Polyvalent metal alkyl salicylate and naphthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and naphthenates can be realized by utilizing alkaline earth metal, e.g. calcium, salts of mixtures of $C_8$-$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between about 60 and 150. Included with the useful polyvalent metal salicylate and naphthenate materials are the methylene and sulfur bridged materials which are readily derived from alkyl substituted salicylic or naphthenic acids or mixtures of either or both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

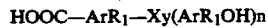  (XXVI)

where Ar is an aryl radical of 1 to 6 rings, $R_1$ is an alkyl group having from about 8 to 50 carbon atoms, preferably 12 to 30 carbon atoms (optimally about 12), X is a sulfur (—S—) or methylene (—$CH_2$—) bridge, y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt o f a methylene bridged phenol-salicylic acid of the general formula (XXVIII):

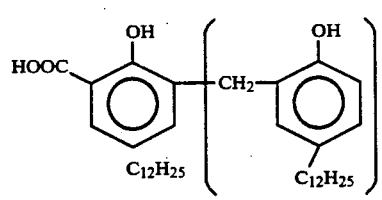

with a TBN of 60 to 150 is highly useful in this invention.

The sulfurized metal phenates can be considered the "metal salt of a phenol sulfide" which thus refers to a metal salt whether neutral or basic, of a compound typified by the general formula (XXVIII):

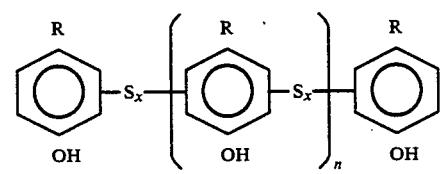

where x=1 or 2, n=0, 1 or 2; or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols which are useful generally contain from about 2 to about 14% by weight, preferably about 4 to about 12 wt. % sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g. basic sulfurized metal dodecyl phenate has a metal content up to and greater than 100% in excess of the metal present in the corresponding normal sulfurized metal phenates wherein the excess metal is produced in oil-soluble or dispersible form (as by reaction with $CO_2$).

Magnesium and calcium containing additives although beneficial in other respects can increase the tendency of the lubricating oil to oxidize. This is especially true of the highly basic sulphonates.

According to a preferred embodiment the invention therefore provides a crankcase lubricating composition also containing from 2 to 8000 parts per million of calcium or magnesium.

The magnesium and/or calcium is generally present as basic or neutral detergents such as the sulphonates and phenates, our preferred additives are the neutral or basic magnesium or calcium sulphonates. Preferably the oils contain from 500 to 5000 parts per million of calcium or magnesium. Basic magnesium and calcium sulphonates are preferred.

As indicated earlier, a particular advantage of the novel dispersants of the present invention is use with V.I improvers to form multi-grade automobile engine lubricating oils. Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g., 20,000 to 250,000, as determined by gel permeation chromatography or osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene and hydrogenated derivatives thereof. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such copolymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$-$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g., see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl)styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 4-vinyl-pyridine, 3-vinyl-pyridine, 3-methyl-5-vinyl-pyridine, 4-methyl-2-vinyl-pyridine, 4-ethyl-2-vinyl-pyridine and 2-butyl-1-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3, 3-dimethylpyrrolidone, N-vinyl-5-ethyl pyrrolidone, etc.

Dihydrocarbyl dithiophosphate metal salts are frequently used as anti-wear agents and also provide antioxidant activity. The zinc salts are most commonly used in lubricating oil in amounts of 0.1 to 10, preferably 0.2 to 2 wt. %, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for imparting improved anti-wear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

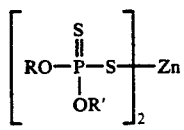

(XXIX)

wherein R and R' may be the same or different hydrocarbyl radicals containing from 1 to 18, preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl etc. In order to obtain oil solubility, the total number of carbon atoms (i.e., R and R' in formula XXIX) in the dithiophosphoric acid will generally be about 5 or greater.

The antioxidants useful in this invention include oil soluble copper compounds. The copper may be blended into the oil as any suitable oil soluble copper compound. By oil soluble we mean the compound is oil soluble under normal blending conditions in the oil or additive package. The copper compound may be in the cuprous or cupric form. The copper may be in the form of the copper dihydrocarbyl thio- or dithio-phosphates wherein copper may be substituted for zinc in the compounds and reactions described above although one mole of cuprous or cupric oxide may be reacted with one or two moles of the dithiophosphoric acid, respectively. Alternatively the copper may be added as the copper salt of a synthetic or natural carboxylic acid. Examples include $C_{10}$ to $C_{18}$ fatty acids such as stearic or palmitic, but unsaturated acids such as oleic or branched carboxylic acids such as napthenic acids of molecular weight from 200 to 500 or synthetic carboxylic acids are preferred because of the improved handling and solubility properties of the resulting copper carboxylates. Also useful are oil soluble copper dithiocarbamates of the general formula $(RR'NCSS)_nCu$, where n is 1 or 2 and R and R' are the same or different hydrocarbyl radicals containing from 1 to 18 and preferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-heptyl, n-octyl, decyl, dodecyl, octadecyl, 2-ethylhexyl, phenyl, butylphenyl, cyclohexyl, methylcyclopentyl, propenyl, butenyl, etc. In order to obtain oil solubility, the total number of carbon atoms (i.e, R and R') will generally be about 5 or greater. Copper sulphonates, phenates, and acetylacetonates may also be used.

Exemplary of useful copper compounds are copper ($Cu^I$ and/or $Cu^{II}$) salts of alkenyl succinic acids or anhydrides. The salts themselves may be basic, neutral or acidic. They may be formed by reacting (a) any of the materials discussed above in the Ashless Dispersant section, which have at least one free carboxylic acid (or anhydride) group with (b) a reactive metal compound. Suitable acid (or anhydride) reactive metal compounds include those such as cupric or cuprous hydroxides, oxides, acetates, borates, and carbonates or basic copper carbonate.

Examples of the metal salts of this invention are Cu salts of polyisobutenyl succinic anhydride (hereinafter referred to as Cu-PIBSA), and Cu salts of polyisobutenyl succinic acid. Preferably, the selected metal employed is its divalent form, e.g., $Cu^{+2}$. The preferred substrates are polyalkenyl succinic acids in which the alkenyl group has a molecular weight greater than about 700. The alkenyl group desirably has a $M_n$ from about 900 to 1400, and up to 2500, with a $M_n$ of about 950 being most preferred. Especially preferred, of those listed above in the section on Dispersants, is polyisobutylene succinic acid (PIBSA). These materials may desirably be dissolved in a solvent, such as a mineral oil, and heated in the presence of a water solution (or slurry) of the metal bearing material. Heating may take place between 70° and about 200° C. Temperatures of 110° to 140° C. are entirely adequate. It may be necessary, depending upon the salt produced, not to allow the reaction to remain at a temperature above about 140° C. for an extended period of time, e.g., longer than 5 hours, or decomposition of the salt may occur.

The copper antioxidants (e.g., Cu-PIBSA, Cu-oleate, or mixtures thereof) will be generally employed in an amount of from about 50–500 ppm by weight of the metal, in the final lubricating or fuel composition.

The copper antioxidants used in this invention are inexpensive and are effective at low concentrations and therefore do not add substantially to the cost of the product. The results obtained are frequently better than those obtained with previously used antioxidants, which are expensive and used in higher concentrations. In the amounts employed, the copper compounds do not interfere with the performance of other components of the lubricating composition, in many instances, completely satisfactory results are obtained when the copper compound is the sole antioxidant in addition to the ZDDP. The copper compounds can be utilized to replace part or all of the need for supplementary antioxidants. Thus, for particularly severe conditions it may be desirable to include a supplementary, conventional antioxidant. However, the amounts of supplementary antioxidant required are small, far less than the amount required in the absence of the copper compound.

While any effective amount of the copper antioxidant can be incorporated into the lubricating oil composition, it is contemplated that such effective amounts be sufficient to provide said lube oil composition with an amount of the copper antioxidant of from about 5 to 500 (more preferably 10 to 200, still more preferably 10 to 180, and most preferably 20 to 130 (e.g., 90 to 120)) part per million of added copper based on the weight of the lubricating oil composition. Of course, the preferred amount may depend amongst other factors on the quality of the basestock lubricating oil.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for $\frac{1}{2}$ to 15 hours, at a temperature in the range of 65° to 315° C. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxyalkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are glycerol mono and dioleates, and succinate esters, or metal salts thereof, of hydrocarbyl substituted succinic acids or anhydrides and thiobis alkanols such as described in U.S. Pat. No. 4,344,853.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an antifoamant of the polysiloxane type, e.g. silicone oil and polydimethyl siloxane.

Organic, oil-soluble compounds useful as rust inhibitors in this invention comprise nonionic surfactants such as polyoxyalkylene polyols and esters thereof, and anionic surfactants such as salts of alkyl sulfonic acids. Such anti-rust compounds are known and can be made by conventional means. Nonionic surfactants, useful as anti-rust additives in the oleaginous compositions of this invention, usually owe their surfactant properties to a number of weak stabilizing groups such as ether linkages. Nonionic anti-rust agents containing ether linkages can be made by alkoxylating organic substrates containing active hydrogens with an excess of the lower alkylene oxides (such as ethylene and propylene oxides) until the desired number of alkoxy groups have been placed in the molecule.

The preferred rust inhibitors are polyoxyalkylene polyols and derivatives thereof. This class of materials are commercially available from various sources: Pluronic Polyols from Wyandotte Chemicals Corporation; Polyglycol 112-2, a liquid triol derived from ethylene oxide and propylene oxide available from Dow Chemical Co.; and Tergitol, dodecylphenyl or monophenyl polyethylene glycol ethers, and Ucon, polyalkylene glycols and derivatives, both available from Union Carbide Corp. These are but a few of the commercial products suitable as rust inhibitors in the improved composition of the present invention.

In addition to the polyols per se, the esters thereof obtained by reacting the polyols with various carboxylic acids are also suitable. Acids useful in preparing these esters are lauric acid, stearic acid, succinic acid, and alkyl- or alkenyl-substituted succinic acids wherein the alkyl-or alkenyl group contains up to about twenty carbon atoms.

The preferred polyols are prepared as block polymers. Thus, a hydroxy-substituted compound, R—(OH)n (wherein n is 1 to 6, and R is the residue of a mono- or polyhydric alcohol, phenol, naphthol, etc.) is reacted with propylene oxide to form a hydrophobic base. This base is then reacted with ethylene oxide to provide a hydrophylic portion resulting in a molecule having both hydrophobic and hydrophylic portions. The relative sizes of these portions can be adjusted by regulating the ratio of reactants, time of reaction, etc., as is obvious to those skilled in the art. Thus it is within the skill of the art to prepare polyols whose molecules are characterized by hydrophobic and hydrophylic moieties which are present in a ratio rendering rust inhibitors suitable for use in any lubricant composition regardless of differences in the base oils and the presence of other additives.

If more oil-solubility is needed in a given lubricating composition, the hydrophobic portion can be increased and/or the hydrophylic portion decreased. If greater oil-in-water emulsion breaking ability is required, the hydrophylic and/or hydrophobic portions can be adjusted to accomplish this.

Compounds illustrative of R—(OH)n include alkylene polyols such as the alkylene glycols, alkylene triols, alkylene tetrols, etc., such as ethylene glycol, propylene glycol, glycerol, pentaerythritol, sorbitol, mannitol, and the like. Aromatic hydroxy compounds such as alkylated mono- and polyhydric phenols and naphthols can also be used, e.g., heptylphenol, dodecylphenol, etc.

Other suitable demulsifiers include the esters disclosed in U.S. Pat. Nos. 3,098,827 and 2,674,619.

The liquid polyols available from Wyandotte Chemical Co. under the name Pluronic Polyols and other similar polyols are particularly well suited as rust inhibitors. These Pluronic Polyols correspond to the formula:

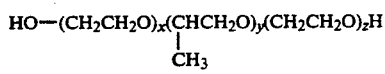  (XXX)

wherein x,y, and z are integers greater than 1 such that the —$CH_2CH_2O$— groups comprise from about 10% to about 40% by weight of the total molecular weight of the glycol, the average molecule weight of said glycol being from about 1000 to about 5000. These products are prepared by first condensing propylene oxide with propylene glycol to produce the hydrophobic base

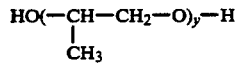  (XXXI)

This condensation product is then treated with ethylene oxide to add hydrophylic portions to both ends of the molecule. For best results, the ethylene oxide units should comprise from about 10 to about 40% by weight of the molecule. Those products wherein the molecular weight of the polyol is from about 2500 to 4500 and the ethylene oxide units comprise from about 10% to about 15% by weight of the molecule are particularly suitable. The polyols having a molecular weight of about 4000 with about 10% attributable to ($CH_2CH_2O$) units are particularly good. Also useful are alkoxylated fatty amines, amides, alcohols and the like, including such alkoxylated fatty acid derivatives treated with $C_9$ to $C_{16}$ alkyl-substituted phenols (such as the mono- and di-heptyl, octyl, nonyl, decyl, undecyl, dodecyl and tridecyl phenols), as described in U.S. Pat. No. 3,849,501, which is also hereby incorporated by reference in its entirety.

These compositions of our invention may also contain other additives such as those previously described, and other metal containing additives, for example, those containing barium and sodium.

The lubricating composition of the present invention may also include copper lead bearing corrosion inhibitors. Typically such compounds are the thiadiazole polysulphides containing from 5 to 50 carbon atoms, their derivatives and polymers thereof. Preferred materials are the derivatives of 1,3,4-thiadiazoles such as those described in U.S. Pat. Nos. 2,719,125; 2,719,126; and 3,087,932; especially preferred is the compound 2,5 bis (t-octadithio)-1,3,4-thiadiazole commercially available as Amoco 150. Other similar materials also suitable are described in U.S. Pat. Nos. 3,821,236; 3,904,537; 4,097,387; 4,107,059; 4,136,043; 4,188,299; and 4,193,882.

Other suitable additives are the thio and polythio sulphenamides of thiadiazoles such as those described in U.K. Patent Specification 1,560,830. When these compounds are included in the lubricating composition, we prefer that they be present in an amount from 0.01 to 10, preferably 0.1 to 5.0 weight percent based on the weight of the composition.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Wt. % A.I. (Preferred) | Wt. % A.I. (Broad) |
|---|---|---|
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the novel dispersants of this invention (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the additives in proper amounts to provide the desired concentration in the final formulation when the additive-package is combined with a predetermined amount of base lubricant. Thus, the dispersants of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein (unless otherwise indicated) are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight, unless otherwise noted and which include preferred embodiments of the invention.

EXAMPLE 1-(A)

Preparation of Ethylene Propylene Copolymer

A 1 liter Zipperclave reactor (Autoclave Engineers) equipped with a water jacket for temperature control, with a septum inlet for syringe injection of catalyst, and with a supply of purified nitrogen, liquid propylene, and ethylene was used in these polymerizations. The reactor was cleaned with hot toluene and then was purged well with dry nitrogen at 100° C. The reactor was cooled to 25° C. and 10.0 cc of a 4.0 wt % toluene solution of methylalumoxane was injected along with 100 cc of distilled toluene at 0 psig under nitrogen. Liquid propylene monomer (200 cc) was added from a calibrated burette at 25° C. The reactor contents were stirred and heated to 115° C. at which point the reactor pressure was 375 psig. 1.00 cc of a toluene solution of bis(n-butylcyclopentadienyl) zirconium dichloride (1.00 mg) was injected and ethylene at a pressure of 405 psig was immediately supplied. Ethylene was fed on pressure demand in order to keep the system pressure at 405 psig. The rate of ethylene flow was recorded continuously during the course of the polymerization. The reaction was continued for 15 minutes after which the reaction was stopped by rapidly depressuring and cooling the reactor to 25° C. The polymer product was collected and the toluene solvent was evaporated in an air stream. The polymer weight was determined to be 103.1 gms, and the polymer was analyzed by size-exclusion chromatography and found to have a number average molecular weight of 1100, a weight average molecular weight of 5400 and a polydispersity of 4.9. The polymer product was found to contain 2.5 ppm Zr and 1.75 ppm Cl.

EXAMPLE 1-(B)

Preparation of Ethylene-Propylene Copolymer Substituted Succinic Anhydride (EPSA)

In a series of runs, 1 mole of the EP copolymer prepared as above and 1.2 mole of pulverized maleic anhydride are charged under dry $N_2$ at atmospheric pressure to a 100 ml. pressure reactor equipped with a stirrer and a thermocouple and heated by means of an electric heating mantle. No added solvent or diluent for the reactants is employed. Rather the reaction is conducted in the melt. The reaction mixture is heated to 70° C. and the reactor is gently purged with dry $N_2$ by bubbling through the liquid reaction mass for 15 minutes. The purging is then ceased and the reactor temperature is raised to 220° C. and kept at that temperature under autogenous pressure for 4 hours while stirring. The liquid reaction mixture is then cooled to about 60° C., and transferred to a glass beaker. Dry gaseous nitrogen is passed through the liquid to strip off unreacted maleic anhydride at about 140° C. until no trace of maleic anhydride is detected with IR. The liquid product containing the EPSA and unreacted EP is analyzed for succinic anhydride by the following titration technique: a 2 g. sample of the polymer is dissolved in a solvent comprising 80 ml of THF, 6 ml of pyridine and 0.3 ml of water and titrated with a methanol solution of tetrabutyl ammonium hydroxide using thymol blue to a color end point. The acidity is calculated from the milliliters of base solution used, and provides a found 0.73 meq of succinic acid per gram of product, as compared ti a theoretical 0.91 meq/g. The conversion to the desired product is therefore about 80.3%, based on the found vs. theoretical meq succinic anhydride per gram in the product. The product is also observed to contain only moderate sediment.

EXAMPLE 2

Preparation of EP-Substituted Amino Phenol

A mixture containing 68.6 g. (0.05 mole) of the ethylene-propylene copolymer substituted succinic anhydride material prepared as in Example 1-B, 5.5 g. (0.05 mole) of 4-aminophenol and 46 g. of S150N lubricating oil (having a $VR_r$ value=3.7) is stirred and slowly heated to 160° C. while under a nitrogen blanket. The reaction mixture is then heated at 160° C. for 3 hours and filtered. The resulting oil solution of N-(hydroxyphenyl) ethylene-propylene copolymer substituted succinimide analyzes for 0.59 wt % N.

EXAMPLE 3

Preparation of Mannich Base Condensation Dispersant Material

About 59.6 g. of the N-(hydroxyphenyl) ethylene-propylene copolymer substituted succinimide solution prepared as in Example 2 is mixed with 2.41 g. (0.0125 mole) of a commercial grade of poly(ethyleneamine) which is a mixture of poly(ethyleneamines) averaging about 5 to 7 nitrogens per molecule (hereinafter referred to as "PAM"), 0.83 g. (0.0275 mole) of formaldehyde, and 2.5 g. of S150N and reacted at 80° C. for one hour under nitrogen atmosphere. The reaction mixture is then heated to 160° C. for one hour and stripped at 160° C. for another hour with nitrogen gas. The reaction product analyzes for 1.8 wt % N. The resulting Mannich Base dispersant material is found to have a VR' value of less than 4.1.

EXAMPLE 4

Mannich Base Condensation

The procedure of Example 3 is repeated except that about 59.6 g. of the N-(hydroxyphenyl) ethylene-propylene copolymer substituted succinimide solution prepared as in Example 2 is mixed with 5.4 g. (0.025 mole) of an amido amine (containing 29.3 wt % N and comprising the reaction product of 1.0 mole of methylacrylate and 1.5 mole of PAM), 0.83 g. (0.025 mole) of formaldehyde and 5.6 g. of S150N. The reaction product analyzes for 2.77 wt % N. The resulting Mannich Base dispersant material is found to have a VR value of less than 4.1.

EXAMPLE 5

Preparation of Mannich Base Condensation Intermediate

About 109 g. (1.0 mole) of 4-aminophenol is dissolved in 100 ml. of toluene. To the solution is added 58 g. (0.5 mole) of 1,6-hexanediamine and 33 g. (1.1 mole) of formaldehyde at 30° C. under $N_2$. The mixture is heated to 100° C. and kept at that temperature for 1 hour in a four necked round bottomed 500 mol flask. Then, the reaction mixture is heated at about 120° C. for about one hour to remove the water of reaction by azeotrope. The reaction mixture is then cooled to room temperature and filtered. The filtrate is then stripped at 130° C. with dry $N_2$ gas to remove toluene.

EXAMPLE 6

Preparation of Mannich Base Condensation Dispersant Material

About 68.6 g. of the ethylene-propylene copolymer substituted succinic anhydride solution prepared as in Example 1-B and 8.95 g. of the 4-hydroxyphenol 1,6-hexanediamine formaldehyde Mannich Base condensate product solution prepared as in Example 5 and 63 g. of S150N lubricating oil (having a $VR_r$ value=3.7) is stirred and slowly heated to 160° C. while under a nitrogen blanket. The reaction mixture is then heated at 160° C. for 3 hours and filtered. The resulting oil solution of Mannich Base condensate dispersant material analyzes for 1.0 wt % N and is found to have a VR' value of less than 4.1.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A lubricating oil dispersant additive which comprises a condensation product obtained by the reaction of:
   (a) at least one ethylene-alpha-olefin polymer substituted mono- or dicarboxylic acid material comprising ethylene alpha-olefin polymer substituted with carboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1;
   (b) at least one N-hydroxyaryl amine compound;
   (c) at least one aldehyde reactant; and
   (d) at least one amine reactant.

2. The dispersant additive of claim 1 wherein said polymer comprises an ethylene-propylene copolymer.

3. The dispersant additive of claim 1 wherein said polymer has a number average molecular weight of from about 700 to about 5,000.

4. The dispersant additive of claim 3 wherein said number average molecular weight is between about 1,500 and 3,000.

5. The dispersant additive of claim 1 wherein said polymer has a molar ethylene content of between about 20 and about 80 percent.

6. The dispersant additive of claim 2 wherein said polymer has a molar ethylene content of between about 45 and about 65 percent, and wherein at least about 60% of said polymer chains contain terminal ethenylidene unsaturation.

7. The dispersant additive of claim 1 wherein said alpha-olefin comprises butene-1.

8. The dispersant additive of claim 2 wherein said number average molecular weight is between about 1,500 and 3,000.

9. The dispersant additive according to claim 1 wherein said amine reactant contains from 2 to 60 carbon atoms and from 1 to 12 nitrogen atoms per molecule.

10. The dispersant additive according to claim 9 wherein said amine reactant comprises a polyalkylenepolyamine wherein said alkylene group contains 2 to 60 carbons and said polyalkylenepolyamine contains from 2 to about 9 nitrogen atoms per molecule.

11. The dispersant additive according to claim 10 wherein said amine reactant comprises polyethylenepolyamine.

12. The dispersant additive according to claim 1 wherein said N-hydroxyaryl amine compound comprises at least one member selected from the group consisting of compounds of the formula:

wherein Ar represents

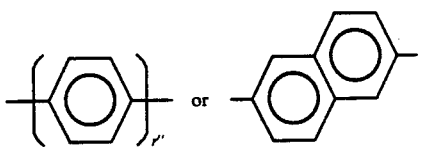

and wherein r is 1 or 2, and derivatives thereof wherein from 1 to 3 ring carbon atoms are each substituted by an alkyl group or halogen atom.

13. The dispersant additive according to claim 12 wherein said N-hydroxyaryl amine compound comprises at least one member selected from the group consisting of compounds of the formula:

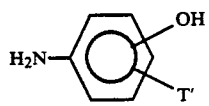

in which T' is hydrogen, alkyl having from 1 to 3 carbon atoms or halogen.

14. The dispersant additive according to claim 12 wherein the Ar group is phenyl.

15. The dispersant additive of claim 12 wherein said polymer comprises an ethylene-propylene copolymer.

16. The dispersant additive of claim 15 wherein said copolymer has a number average molecular weight of from about 700 to about 5,000.

17. A concentrate containing from about 3 to 45 weight percent of a dispersant adduct which comprises a condensation product obtained by the reaction of:
   (a) at least one ethylene-alpha-olefin polymer substituted mono- or dicarboxylic acid material comprising ethylene alpha-olefin polymer substituted with monounsaturated carboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1;
   (b) at least one N-hydroxyaryl amine compound;
   (c) at least one aldehyde reactant; and
   (d) at least one amine reactant.

18. A concentrate containing from about 10 to 35 weight percent of the dispersant adduct which comprises a condensation product obtained by the reaction of:
- (a) at least one ethylene-propylene copolymer substituted with carboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, said copolymer having a number average molecular weight of from about 300 to 10,000 and an average of at least about 30% of said copolymer chains contain terminal ethylidene unsaturation, said copolymer substituted mono- or dicarboxylic acid material being characterized by a VR value of less than about 4.1;
- (b) at least one N-hydroxyaryl amine compound;
- (c) at least one aldehyde reactant; and
- (d) at least one amine reactant.

19. A lubricating oil composition containing from about 0.1 to 20 weight percent of a dispersant adduct which comprises a condensation product obtained by the reaction of:
- (a) at least one ethylene-alpha-olefin polymer substituted mono- or dicarboxylic acid material comprising ethylene alpha-olefin polymer substituted with carboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1;
- (b) at least one N-hydroxyaryl amine compound;
- (c) at least one aldehyde reactant; and
- (d) at least one amine reactant.

20. A lubricating oil composition containing from about 0.1 to 20 weight percent of a dispersant adduct which comprises a condensation product obtained by the reaction of:
- (a) at least one ethylene-alpha-olefin polymer substituted mono- or dicarboxylic acid material comprising ethylene alpha-olefin polymer substituted with carboxylic acid moieties selected from the group consisting of $C_4$ to $C_{10}$ monounsaturated dicarboxylic acid producing moieties, and $C_3$ to $C_{10}$ monounsaturated monocarboxylic acid producing moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1;
- (b) at least one N-hydroxyaryl amine compound which comprises at least one member selected from the group consisting of compounds of the formula:

$$H_2N-Ar-OH$$

wherein Ar represents phenyl;
- (c) at least one aldehyde reactant; and
- (d) at least one amine reactant.

21. A lubricating oil dispersant additive which comprises a Mannich Base condensation product obtained by the steps of:
- (i) providing a carbonyl-amino material obtained by reacting (a) at least one ethylene-alpha-olefin polymer substituted mono- or dicarboxylic acid material comprising ethylene alpha-olefin polymer substituted with $C_4$ to $C_{10}$ monounsaturated dicarboxylic acid producing moieties, or $C_3$ to $C_{10}$ monounsaturated monocarboxylic acid moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1; with (b) at least one N-hydroxyaryl amine compound, to form said carbonyl-amino material; and
- (ii) contacting said carbonyl-amino material with (c) at least one aldehyde reactant; and (d) at least one amine reactant for a time and under conditions sufficient to form said Mannich Base condensation dispersant product.

22. The dispersant additive of claim 21 wherein said polymer comprises an ethylene-propylene copolymer.

23. The dispersant additive of claim 21 wherein said polymer has a number average molecular weight of from about 700 to about 5,000.

24. The dispersant additive of claim 23 wherein said number average molecular weight is between about 1,500 and 3,000.

25. The dispersant additive of claim 21 wherein said polymer has a molar ethylene content of between about 20 and about 80 percent.

26. The dispersant additive of claim 22 wherein said polymer has a molar ethylene content of between about 45 and about 65 percent, and wherein at least about 60% of said polymer chains contain terminal ethenylidene unsaturation.

27. The dispersant adduct according to claim 21 wherein the nucleophilic reagent comprises an amine containing from 2 to 60 carbon atoms and from 1 to 12 nitrogen atoms per molecule.

28. The dispersant adduct according to claim 27 wherein said amine comprises a polyalkylenepolyamine wherein said alkylene group contains 2 to 60 carbons and said polyalkylenepolyamine contains from 2 to about 9 nitrogen atoms per molecule.

29. The dispersant adduct according to claim 28 wherein said amine comprises polyethylenepolyamine.

30. The dispersant adduct according to claim 21 wherein said N-hydroxyaryl amine compound comprises at least one member selected from the group consisting of compounds of the formula:

$$H_2N-Ar-OH$$

wherein Ar represents

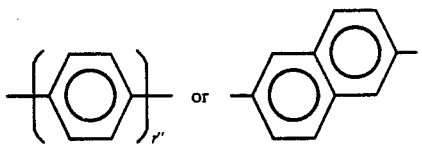

and wherein r" is 1 or 2, and derivatives thereof wherein from 1 to 3 ring carbon atoms are each substituted by an alkyl group or halogen atom.

31. The dispersant adduct according to claim 30 wherein said N-hydroxyaryl amine compound comprises at least one member selected from the group consisting of compounds of the formula:

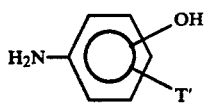

in which T' is hydrogen, alkyl having from 1 to 3 carbon atoms or halogen.

32. The dispersant adduct according to claim 30 wherein the Ar group is phenyl.

33. The dispersant adduct according to claim 30 wherein said N-hydroxyaryl amine compound comprises 4-aminophenol.

34. A lubricating oil dispersant additive which comprises a Mannich Base condensation product obtained by the steps of:
(i) providing a N-hydroxyaryl amine-containing Mannich base intermediate obtained by reacting at least one N-hydroxyaryl amine compound, at least one aldehyde reactant and at least one amine reactant, said N-hydroxyaryl amine-containing Mannich base intermediate comprising at least one compound selected from the group consisting of:
(a) adducts of the structure:

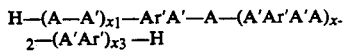

wherein $x_1$ is 0 or 1, $x_2$ is an integer of 0 to 8, $x_3$ is 0 or 1, A is a bivalent bis(N terminated) amino group derived from said amine reactant and contains from 2 to 60 carbon atoms and from 1 to 12 nitrogen atoms, A' comprises the group —CH(T")— wherein T" is H or alkyl of from 1 to 9 carbon atoms and is derived from the said aldehyde reactant, and Ar' comprises the moiety:

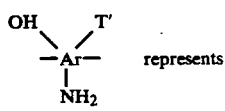

represents

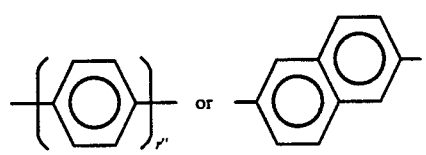

and wherein r" is 1 or 2, and derivatives thereof from 1 to 3 ring carbon atoms are each substituted by an alkyl group or halogen atom, wherein T' is H, alkyl of 1 to 3 carbons or halogen, and Ar and
(b) adducts of the structure:

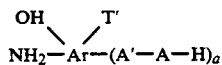

wherein T', A', Ar and A are as defined above, and "a" is a number of from 1 to 2; and (ii) contacting said N-hydroxyaryl amine-containing Mannich base intermediate with (a) at least one polymer substituted mono- or dicarboxylic acid material comprising ethylene alpha-olefin polymer substituted with $C_4$ to $C_{10}$ monounsaturated dicarboxylic acid producing moieties or $C_3$ to $C_{10}$ monounsaturated monocarboxylic acid moieties, said polymer comprising monomer units derived from ethylene and at least one alpha-olefin of the formula $H_2C=CHR^1$, wherein $R^1$ is an alkyl group of from 1 to 18 carbon atoms, and wherein said polymer has a number average molecular weight of from about 300 to 10,000 and an average of at least about 30% of said polymer chains contain terminal ethenylidene unsaturation, said polymer substituted mono- or dicarboxylic acid material being characterized by a VR value of less than about 4.1 for a time and under conditions sufficient to form said Mannich Base condensation dispersant product.

35. The dispersant additive of claim 34 wherein said polymer comprises an ethylene-propylene copolymer.

36. The dispersant additive of claim 34 wherein said polymer has a number average molecular weight of from about 700 to about 5,000.

37. The dispersant additive of claim 36 wherein said number average molecular weight is between about 1,500 and 3,000.

38. The dispersant additive of claim 34 wherein said polymer has a molar ethylene content of between about 20 and about 80 percent.

39. The dispersant additive of claim 35 wherein said polymer has a molar ethylene content of between about 45 and about 65 percent, and wherein at least about 60% of said polymer chains contain terminal ethenylidene unsaturation.

40. The dispersant adduct according to claim 34 wherein the nucleophilic reagent comprises an amine containing from 2 to 60 carbon atoms and from 1 to 12 nitrogen atoms per molecule.

41. The dispersant adduct according to claim 40 wherein said amine comprises a polyalkylenepolyamine wherein said alkylene group contains 2 to 60 carbons and said polyalkylenepolyamine contains from 2 to about 9 nitrogen atoms per molecule.

42. The dispersant adduct according to claim 41 wherein said amine comprises polyethylenepolyamine.

43. The dispersant adduct according to claim 40 wherein said amine comprises an amido-amine.

44. The dispersant adduct according to claim 40 wherein said polymer comprises an ethylene-propylene copolymer.

45. The dispersant adduct according to claim 44 wherein the Ar group is phenyl and T' is H or alkyl of 1 to 3 carbon atoms.

46. The dispersant adduct according to claim 34 wherein said N-hydroxyaryl amine compound comprises 4-aminophenol.

* * * * *